(12) United States Patent
Matsuo et al.

(10) Patent No.: US 6,192,838 B1
(45) Date of Patent: Feb. 27, 2001

(54) ENGINE COOLING APPARATUS

(75) Inventors: Hiroki Matsuo; Tetsuji Nobuta; Kazuya Makizono, all of Kariya; Toshio Morikawa, Toyota; Hikaru Sugi, Nagoya; Shun Kurata, Kariya; Manabu Miyata, Obu; Koji Ito, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/266,434

(22) Filed: Mar. 11, 1999

(30) Foreign Application Priority Data

Mar. 13, 1998 (JP) .................................................. 10-063178
Mar. 13, 1998 (JP) .................................................. 10-063179
Nov. 19, 1998 (JP) .................................................. 10-329799
Jan. 19, 1999 (JP) .................................................. 11-011055

(51) Int. Cl.$^7$ ...................................................... F01P 7/14
(52) U.S. Cl. .................................. 123/41.01; 123/41.11; 123/41.49
(58) Field of Search ........................... 123/198 E, 41.01, 123/41.11, 41.49

(56) References Cited

U.S. PATENT DOCUMENTS

| | | | |
|---|---|---|---|
| 4,181,172 | * | 1/1980 | Longhouse ..................... 123/41.49 |
| 4,202,296 | * | 5/1980 | Nonnenmann et al. ........ 123/41.49 |
| 4,213,426 | * | 7/1980 | Longhouse ..................... 123/41.49 |
| 5,024,267 | * | 6/1991 | Yamaguchi et al. ............ 123/41.49 |
| 5,839,397 | * | 11/1998 | Funabashi et al. ............ 123/41.49 |

FOREIGN PATENT DOCUMENTS

| | | |
|---|---|---|
| 62-66818 | 4/1987 | (JP) . |
| 62-128112 | 8/1987 | (JP) . |
| 4-257735 | 9/1992 | (JP) . |
| 9-60520 | 3/1997 | (JP) . |
| 10-54239 | 2/1998 | (JP) . |

* cited by examiner

Primary Examiner—Marguerite McMahon
Assistant Examiner—Jason Benton
(74) Attorney, Agent, or Firm—Harness, Dickey & Pierce, PLC

(57) ABSTRACT

An engine cooling apparatus suitable for use in a vehicle shortens engine warm-up time without decreasing the heat-radiation capacity of a radiator. A shroud is disposed between a radiator and a water-cooled engine. A first air passage for blowing air toward the engine and its auxiliaries is formed in the upper side of the shroud, and a second air passage for discharging air having passed through the radiator to outside the engine compartment is formed in the lower side of the shroud. Accordingly, air is prevented from directly striking the engine and from passing around to the upstream side of the radiator through gaps between the walls of the engine compartment and the radiator. Thus the engine warm-up time is shortened without reducing the heat-radiation capacity of the radiator.

23 Claims, 32 Drawing Sheets

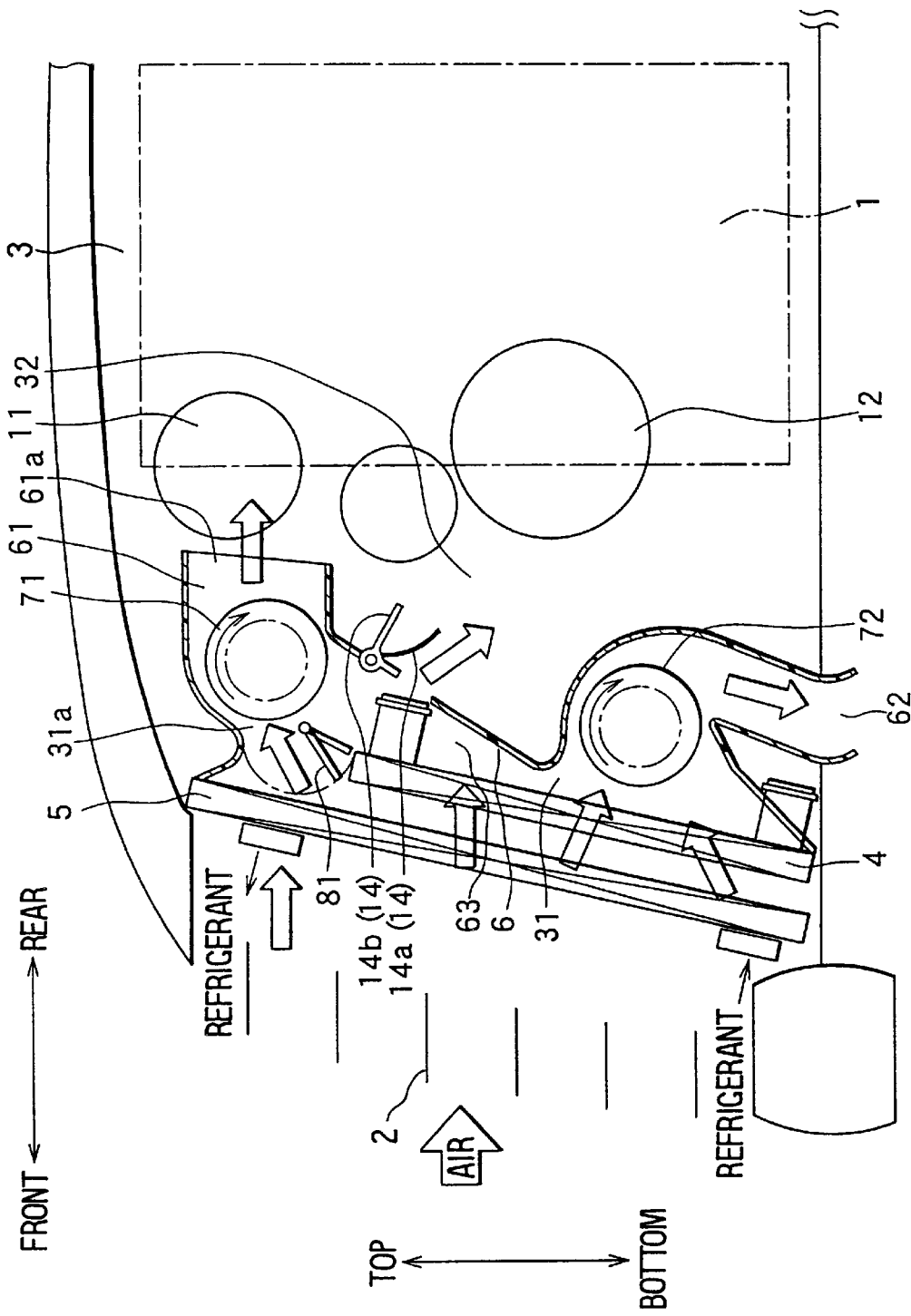

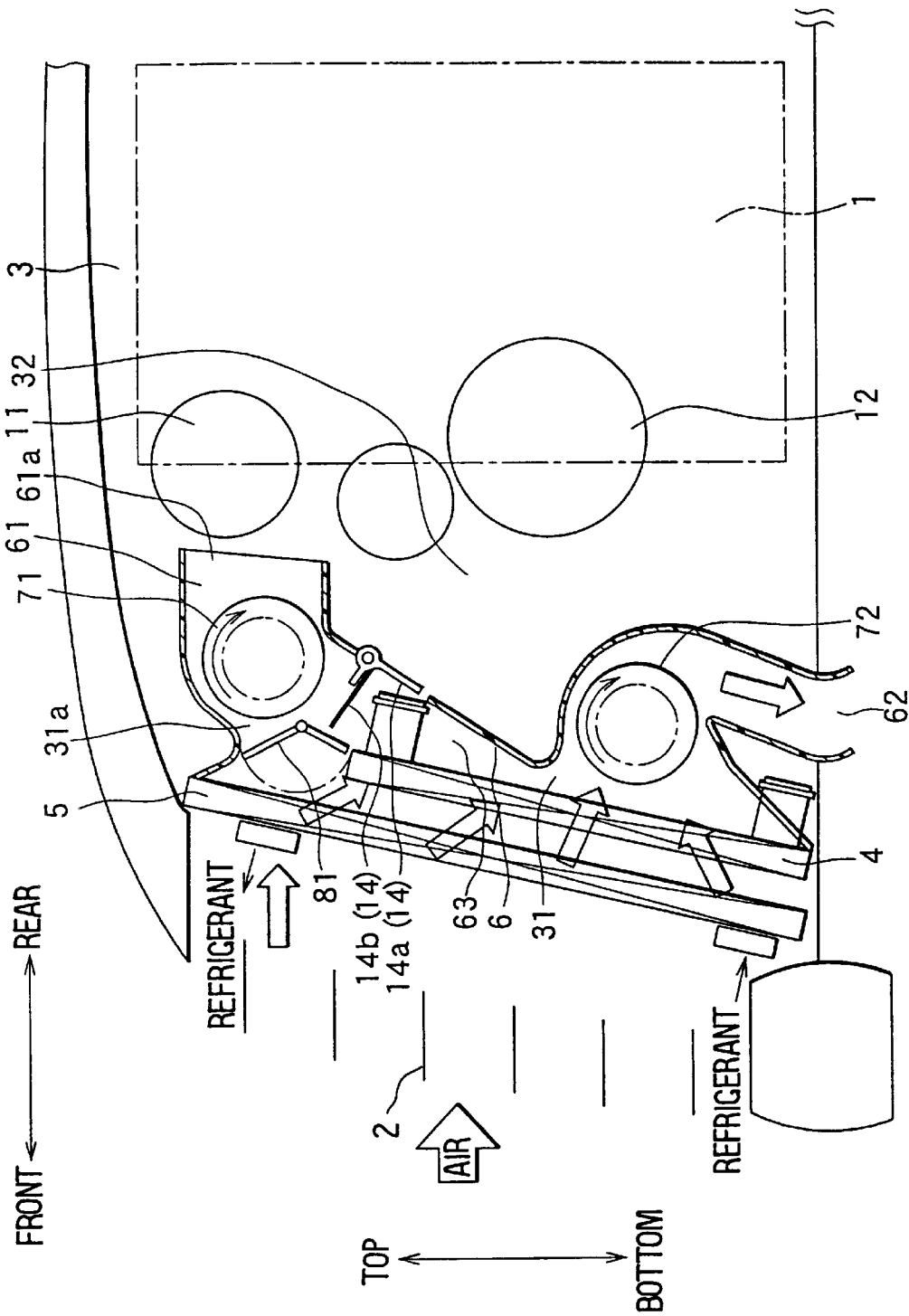

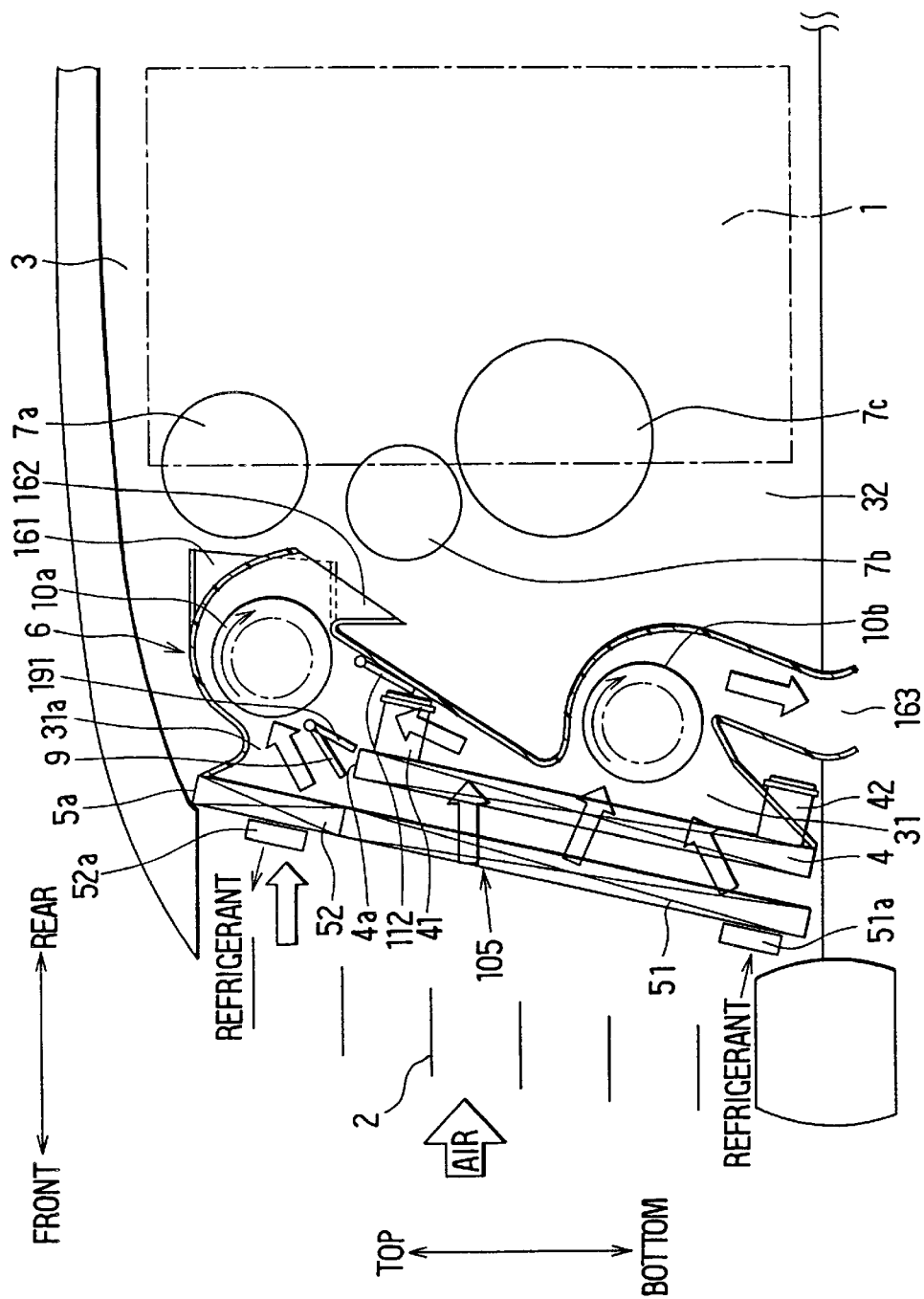

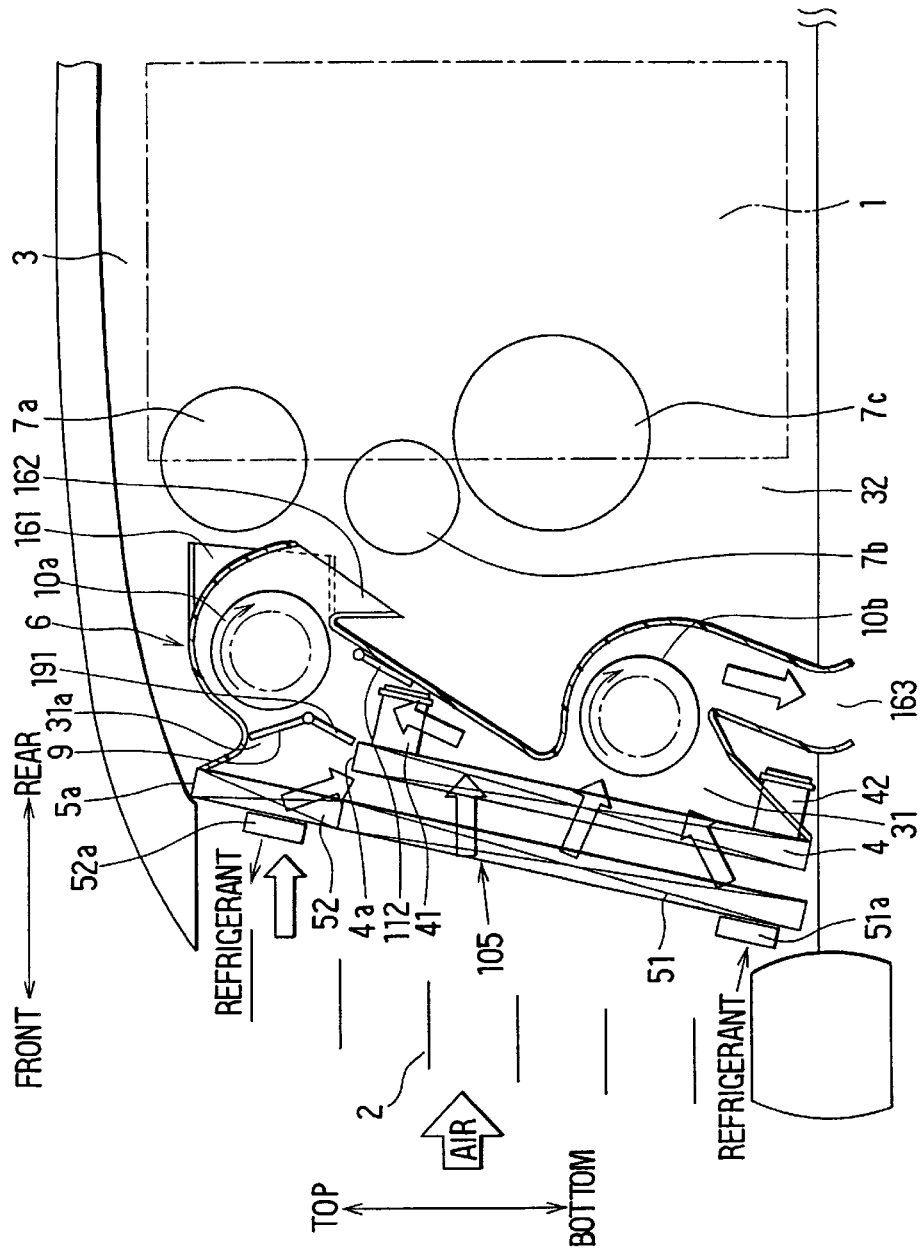

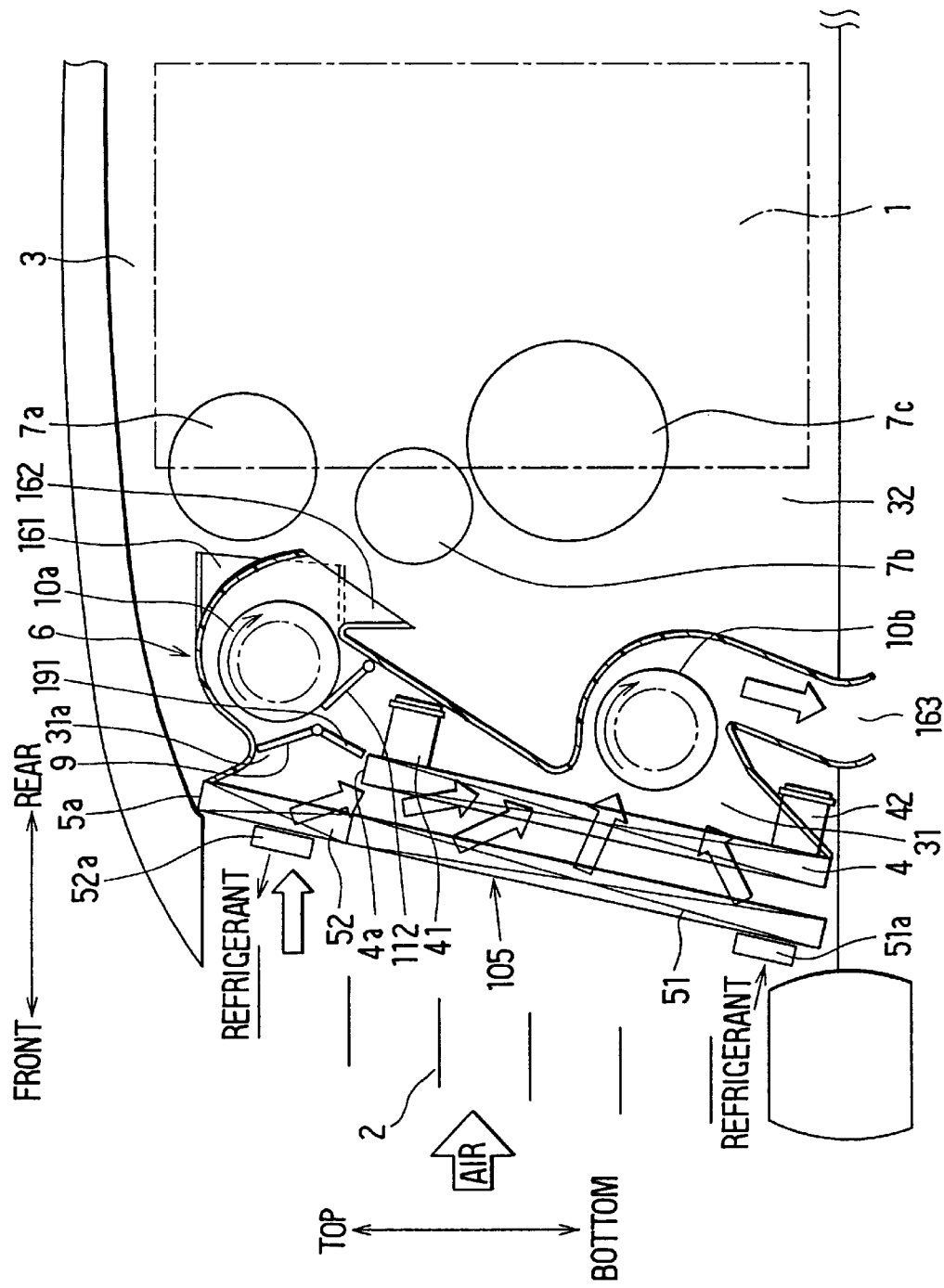

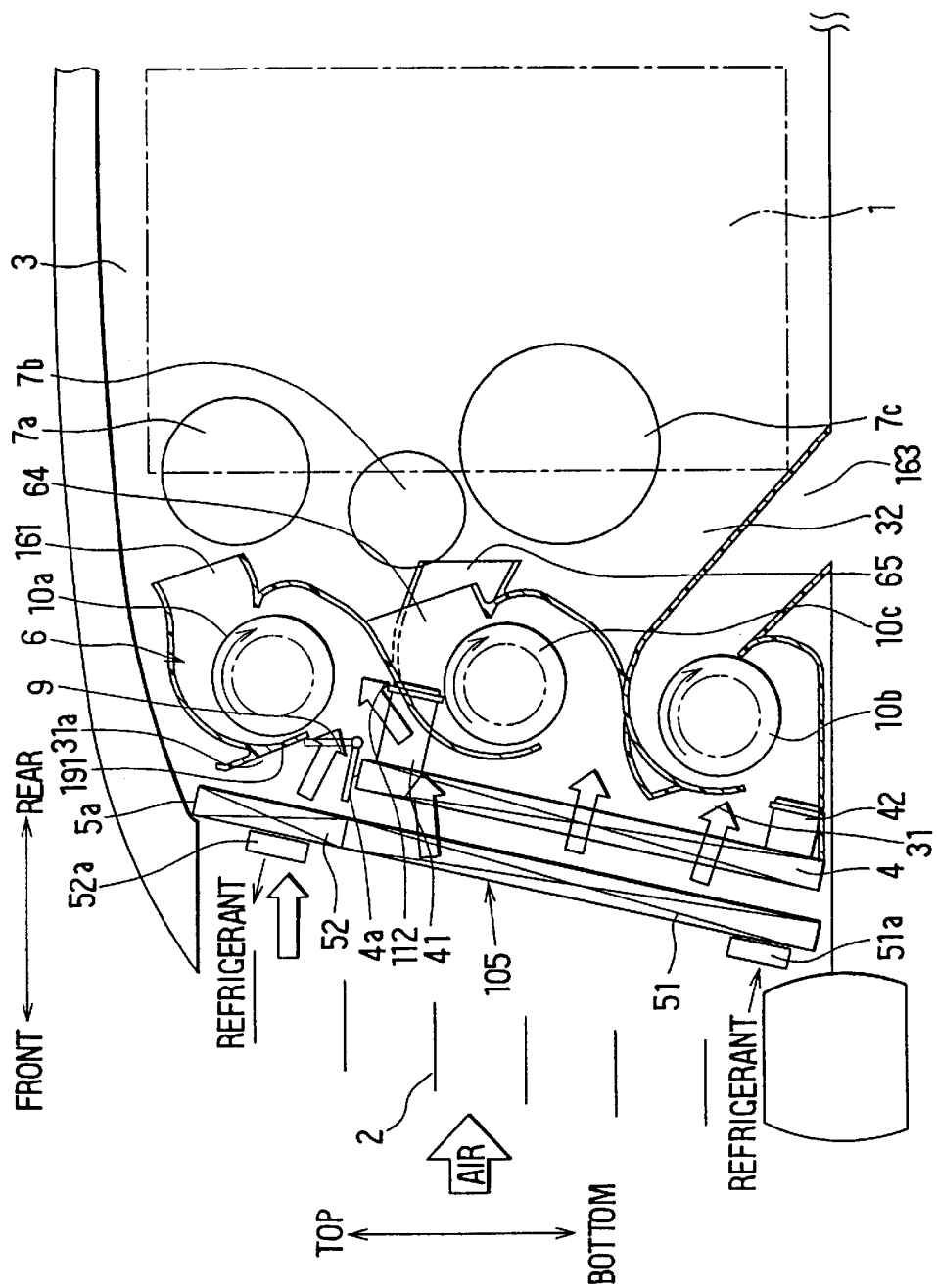

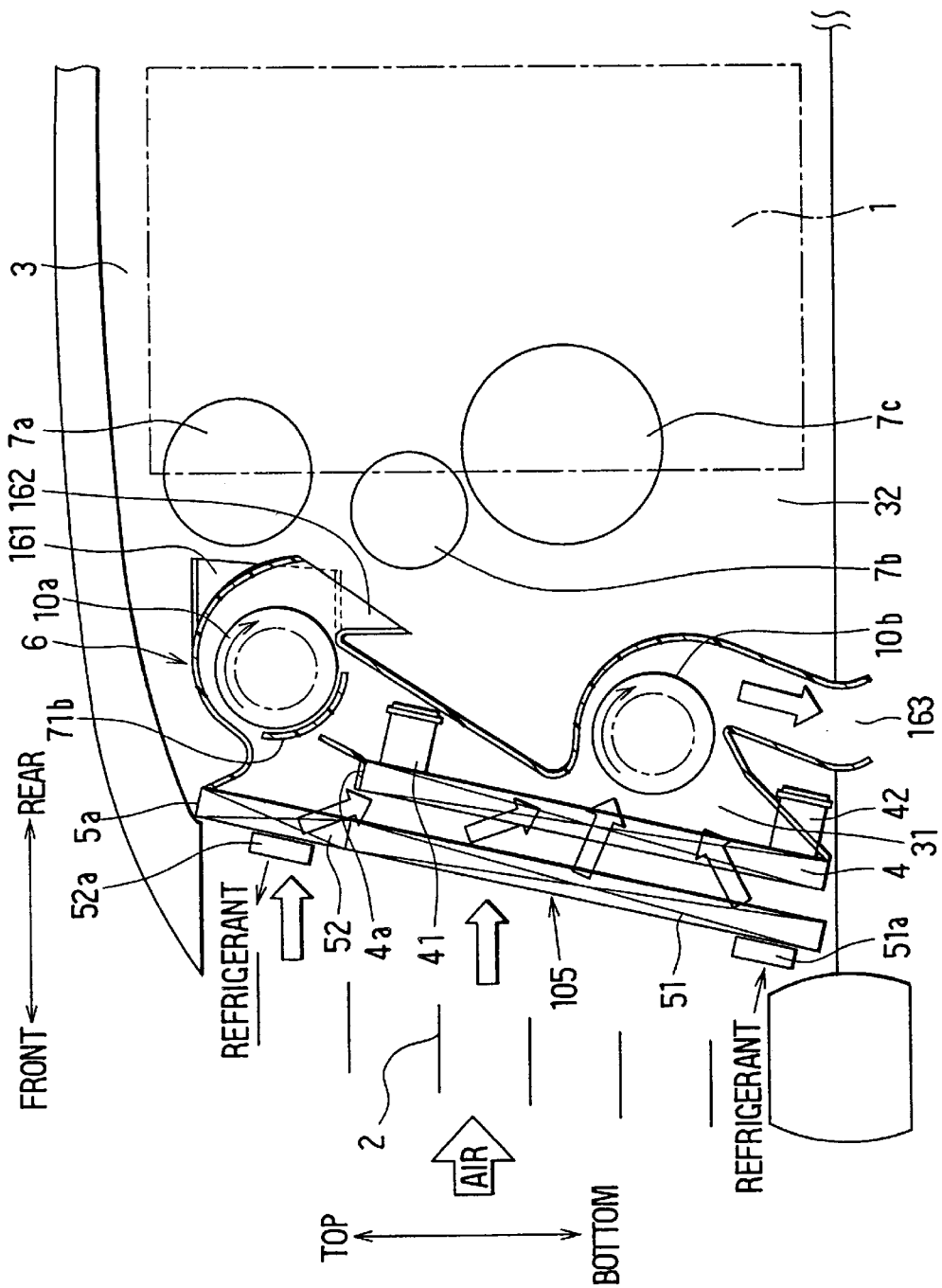

ENGINE COOLING APPARATUS

CROSS REFERENCE TO RELATED APPLICATIONS

This application relates to and claims priority from Japanese Patent Application Nos. Hei. 10-63178, filed on Mar. 13, 1998, Hei. 10-63179, filed on Mar. 13, 1998, Hei. 10-329799, filed on Nov. 19, 1998, and Hei. 11-11055, filed on Jan. 18, 1999, the entire contents of which are incorporated herein by reference.

BACKGROUND OF THE INVENTION

1. Field of the Invention

The present invention relates to a cooling apparatus for a water-cooled engine (hereinafter referred to "engine"), and particularly to a cooling apparatus suitable for use in a vehicle.

2. Description of Related Art

In an engine cooling apparatus for a vehicle, for example as described in JP-A-4-257735, with respect to a flow of air entering a vehicle engine compartment from the front side of the engine compartment, a radiator is disposed on the upstream side of the engine.

According to the prior art cooling apparatus described in the publication mentioned above, however, air passing through the radiator directly strikes the engine. Therefore, the engine is cooled by the cold air passing through the radiator in winter season or at times of cold starting, such as immediately after the engine start. Accordingly, there is a problem that it takes a long time to warm up the engine.

Also, because the air passing through the radiator strikes the engine to cool the engine, the temperature of the air having struck the engine is higher than that of the air immediately after the radiator, and some of the air having struck the engine passes around and returns to the upstream side of the radiator through gaps between the inner periphery of the engine compartment and the radiator.

Consequently, the problem arises that because this heated air having struck the engine and passed around to the upstream side of the radiator then passes through the radiator again, the heat-radiation capacity (cooling capacity) of the radiator may be compromised.

Furthermore, according to JP-A-4-257735, a heat exchanger, such as a condenser of a refrigerating cycle, and a radiator are disposed in series with respect to the air flow, and a bypass passage for allowing air to bypass the heat exchanger is formed on the lower side of the heat exchanger.

However, because the bypass passage is provided alongside the heat exchanger, the heat exchanger must inevitably be made small. Accordingly, the heat-radiation capacity of the heat exchanger is compromised, and the pressure inside the heat exchanger rises. Consequently, there is the problem that the compression work of the refrigeration cycle increases.

In addition, because the water-cooled engine is disposed on the downstream side of the radiator, there is also the problem that air having been heated by the radiator is taken in by the engine and consequently the output of the engine is compromised.

SUMMARY OF THE INVENTION

The present invention is made in light of the foregoing problem, and it is an object of the present invention to shorten the engine warm-up time while avoiding the compromise in the heat-radiation capacity of the radiator.

It is another object of the present invention to prevent an increase in the compression work of the refrigerating cycle thereby improve engine output.

According to the present invention, a cooling apparatus has a dividing wall for dividing the inside of an engine compartment into a radiator side space and an engine side space between a radiator and a water-cooled engine in the engine compartment.

Accordingly, the air having passed through the radiator is prevented from directly striking the water-cooled engine. Thus, for example in winter and at times of cold starting, because the water-cooled engine is not cooled by air having passed through the radiator, warming up the engine is expedited.

Also, because air passing through the radiator can be prevented from directly striking the engine, the phenomenon of air having struck the engine passing around to the upstream side of the radiator through the gaps between inner periphery of the engine compartment and the radiator is prevented, and the heat-radiation capacity of the radiator is improved.

Therefore, the engine warm-up time is shortened while avoiding a compromise in the heat-radiation capacity of the radiator.

According to another aspect of the present invention, an engine cooling apparatus includes a bypass passage for guiding air to the water-cooled engine so that it bypasses the radiator, and includes a bypass passage opening and closing door for, when the load on the water-cooled engine is equal to or greater than a predetermined value, increasing the flow of air passing through the radiator by closing the bypass passage.

Accordingly, the heat-radiation area of the heat exchanger becomes larger than the prior art in which the bypass passage is formed below the heat exchanger, and the heat-radiation capacity of the heat exchanger is prevented from compromising. As a result, a compression work increase of the refrigerating cycle is prevented.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 15 is a schematic view showing a fifth mode of the engine cooling apparatus according to the fifth embodiment;

FIG. 16 is a schematic view showing a sixth mode of the engine cooling apparatus according to the fifth embodiment;

FIG. 17 is a schematic view showing a first mode of an engine cooling apparatus according to a sixth embodiment of the present invention;

FIG. 20 is a schematic view showing a second mode of the sixth embodiment;

FIG. 21 is a schematic view showing a third mode of the sixth embodiment;

FIG. 22 is a schematic view showing an engine cooling apparatus according to a seventh embodiment of the present invention;

FIG. 34 is a schematic view showing a third mode of the modification example.

DETAILED DESCRIPTION OF PREFERRED EMBODIMENTS (First Embodiment)

Figure 1:
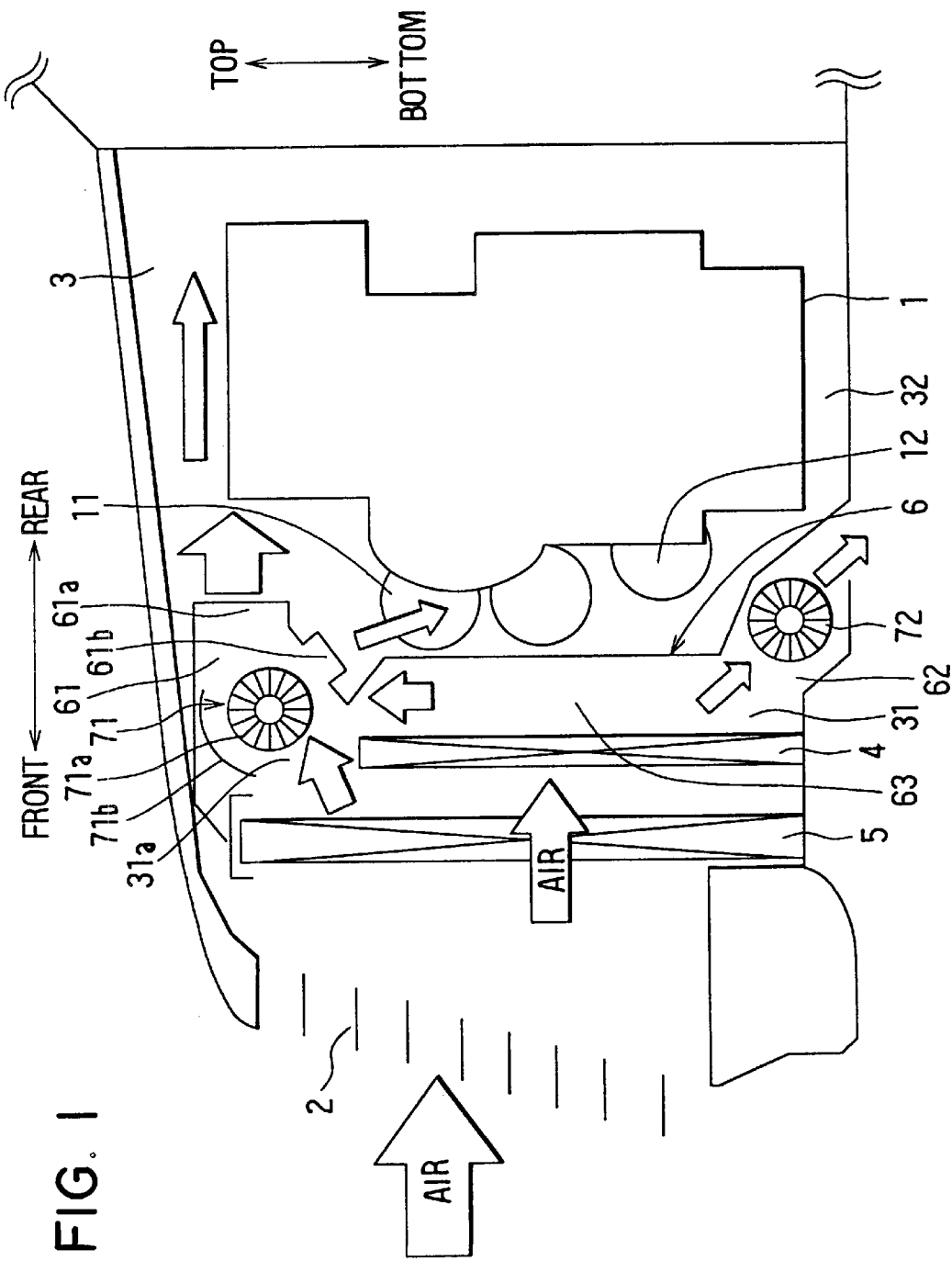
FIG. 1 is a schematic view showing a first mode of an engine cooling apparatus according to a first embodiment of the present invention.

In FIG. 1, the reference numeral 1 represents a water-cooled engine (water-cooled internal combustion engine) of a vehicle, and this water-cooled engine (hereinafter, engine) is mounted in a vehicle engine compartment 3 having at the front end of the vehicle an air inlet (front grill) 2 through which air is taken in. The engine 1 is positioned in the downstream side of the engine compartment 3 with respect to a flow of air entering the engine compartment 3 through the air inlet 2.

A radiator 4, for exchanging heat between air and cooling water circulating inside the engine 1 to cool the engine 1, is disposed inside the engine compartment 3 between the air inlet 2 and the engine 1. A condenser 5, functions as a heat-radiation apparatus of a vehicle air-conditioning system, is disposed on the upstream side of this radiator 4.

Also, a shroud 6, made of resin and functions as a dividing wall dividing the engine compartment 3 into a first space 31 on the radiator 4 side and a second space 32 on the engine 1 side, is disposed between the radiator 4 and the engine 1. In the upper side (top side) of the shroud 6 there is formed a first air passage 61 for guiding air having flowed into the first space 31 through the air inlet 2 (hereinafter referred to as "incoming air") into the second space 32. In the lower side (bottom side) of the shroud 6 there is formed a second air passage 62 for guiding the incoming air to outside the engine compartment 3. A third air passage 63, formed by the radiator 4 and the shroud 6, guides air having passed through the radiator 4 into the air passages 61, 62.

In the first air passage 61 are formed a first outlet 61a for blowing air toward the upper side of the engine 1 (and toward the rear of the vehicle) and a second outlet 61b for blowing air toward auxiliary equipment connected to the engine 1 such as a hydraulic power steering pump 11, an air-conditioning compressor 12, and a generator (alternator).

A bypass passage 31a for bypassing the radiator 4 and for guiding the incoming air to the first air passage 61 is formed above the radiator 4 in the first space 31. The bypass passage 31a connects with the third air passage 63 as well as with the first air passage 61.

A first blower 71, for adjusting the state of connection of the bypass passage 31a, the third air passage 63 and the first air passage 61, and forcibly discharging the incoming air to outside the first space 31, is disposed where the bypass passage 31a and the third air passage 63 connect. Also, a second blower 72, for forcibly discharging air flowing into the second air passage 62 via the third air passage 63 to outside the engine compartment 3, is disposed in the second air passage 62.

The blowers 71, 72 are cross-flow fans wherein air passes through a cross-section perpendicular to the axis of a multivane impeller. The first blower 71 has a cross-sectionally arcuate rotary door 71b mounted rotatably around its multivane impellers 71a. The connecting conditions among respective passages 31a, 61 and 63 are adjusted by rotating the rotary door 71b.

As is clear from FIG. 1, the area of the condenser 5 as seen from the air inlet 2 (its area as projected onto a plane parallel to the vertical and left-right directions of the vehicle) is larger than the area of the radiator 4 as seen from the air inlet 2 (its area as projected onto a plane perpendicular to the incoming air flow), and this difference in area between the radiator 4 and the condenser 5 is approximately equivalent to the cross-sectional area of the bypass passage 31a.

The operation of the first embodiment will now be described.

1. First Mode (see FIG. 1)

This first mode is executed at times, such as in summer, when the outside air temperature is high, and at times, such as when the load on the engine 1 is small, when the amount of heat produced by the engine 1 is small and not much heat-radiation capacity is required of the radiator 4.

Specifically, the bypass passage 31a and the third air passage 63 and the first air passage 61 are connected, and the two blowers 71, 72 are operated, whereby some of the incoming air is blown through the first air passage 61 into the second space 32 and the rest is discharged through the second air passage 62 (the lower side of the engine compartment 3) to outside the engine compartment 3.

Figure 2:
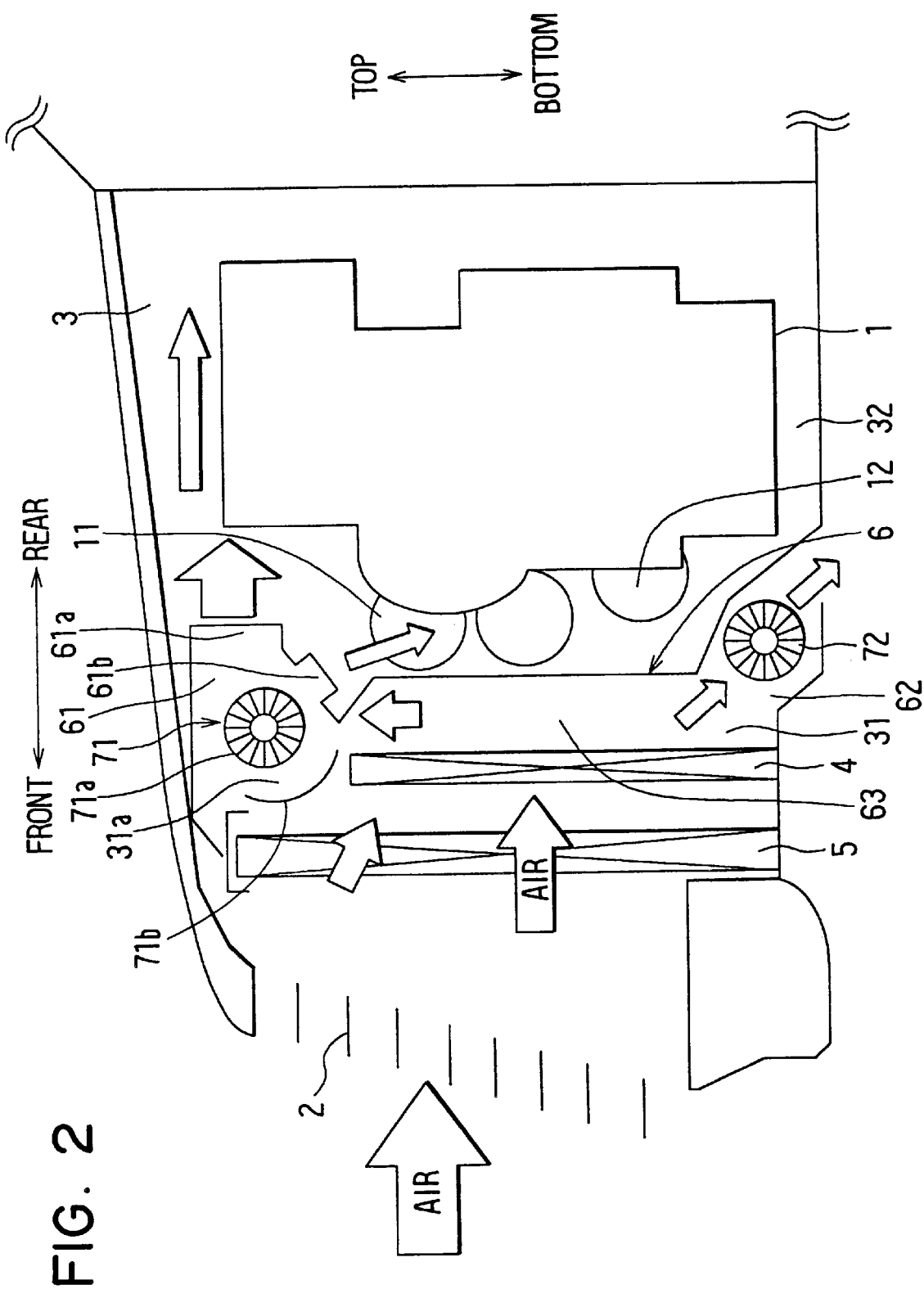
FIG. 2 is a schematic view showing a second mode of the engine cooling apparatus according to the first embodiment.

2. Second Mode (see FIG. 2)

This second mode is executed when the load on the engine 1 has increased.

Specifically, the bypass passage 31a is closed and the incoming air passes through the radiator 4, and the blowers 71, 72 are operated, whereby some of the air having flowed into the third air passage 63 through the radiator 4 is blown through the first air passage 61 into the second space 32 and the rest is discharged through the second air passage 62 (the lower side of the engine compartment 3) to outside the engine compartment 3.

Figure 3:
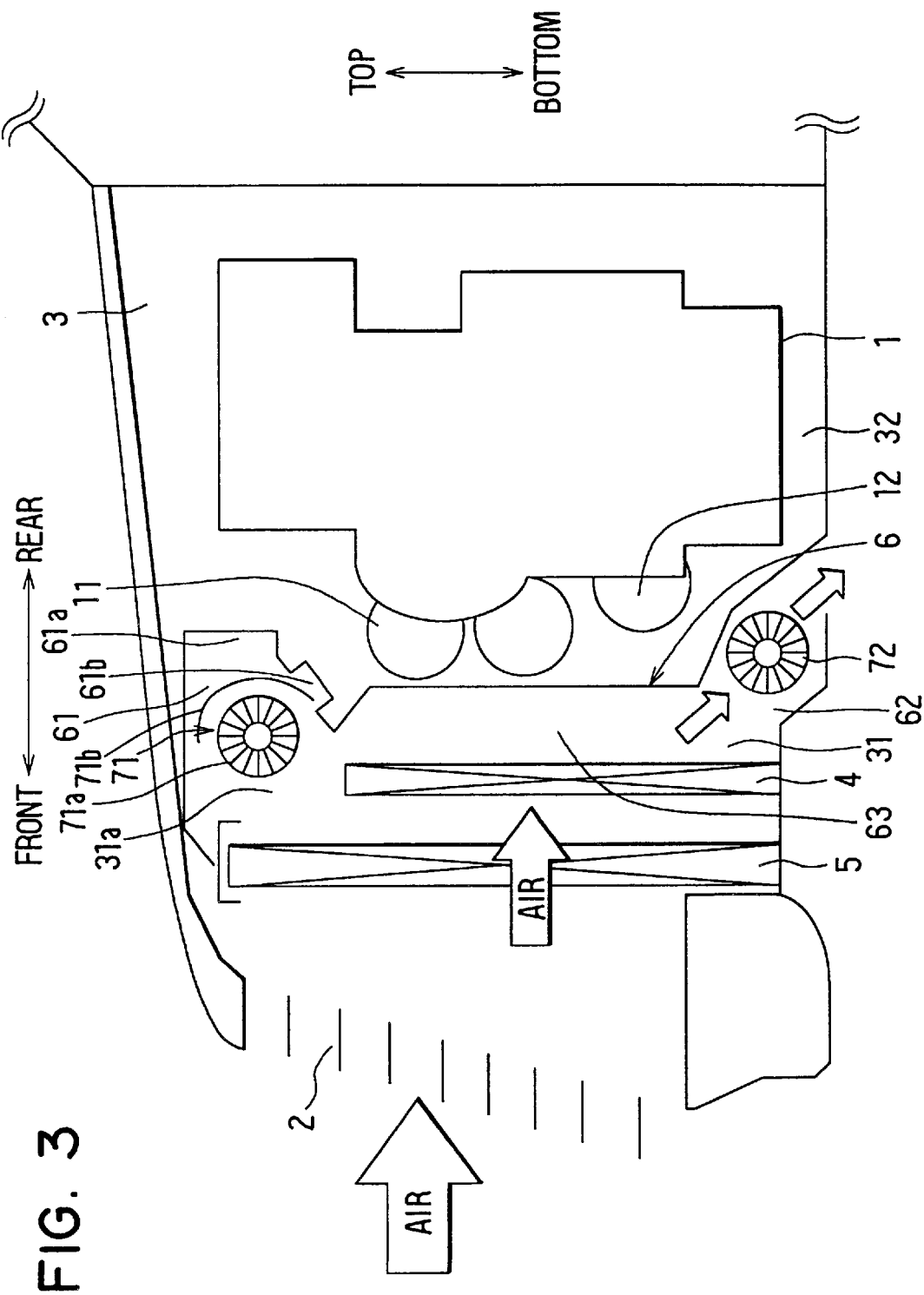
FIG. 3 is a schematic view showing a third mode of the engine cooling apparatus according to the first embodiment.

3. Third Mode (see FIG. 3)

This third mode is executed at times, such as in winter, when the outside air temperature is low.

Specifically, the first air passage 61 (both of the outlets 61a, 61b) is closed, and the bypass passage 31a and the third air passage 63 are connected to discharge all of the incoming air through the second air passage 62 (the lower side of the engine compartment 3) to outside the engine compartment 3.

In the first embodiment, the mode-switching is carried out on the basis of the cooling water temperature detected by a water temperature sensor (not shown), provided on the engine 1, detecting the cooling water temperature, and the incoming air temperature detected by an outside air temperature sensor (not shown), disposed at the air inlet 2, detecting the temperature of the incoming air.

Specifically, when the temperature Ta detected by the outside air temperature sensor is equal to or greater than a predetermined temperature Ta0 and the temperature Tw detected by the water temperature sensor is less than a predetermined temperature Tw0, the first mode is executed. When the detected temperature Ta is equal to or greater than the predetermined temperature Ta0 and the detected temperature Tw is equal to or greater than the predetermined temperature Tw0, the second mode is executed. When the detected temperature Ta is less than the predetermined temperature Ta0, the third mode is executed.

Except when the vehicle air-conditioning system is stopped and furthermore the detected temperature Tw is less than the predetermined temperature Tw0, the second blower 72 operates at all times.

Some characterizing features of the first embodiment will now be described.

According to the first embodiment, because a shroud 6 dividing the engine compartment 3 into a first space 31 and a second space 32 is provided between the radiator 4 and the engine 1, air passing through the radiator 4 is prevented from directly striking the engine 1. Therefore, for example in winter and at times of cold starting, since the engine 1 is not cooled by air passing through the radiator 4, warming up the engine is facilitated.

Also, since air passing through the radiator 4 is refrained from directly striking the engine 1, the phenomenon of air having struck the engine 1 returning to the upstream side of the radiator 4 through gaps between the sides of the engine compartment 3 and the radiator 4 can be prevented, and the heat-radiation capacity of the radiator 4 can thereby be prevented from falling.

Thus, with a cooling apparatus according to the first embodiment, it is possible to shorten the engine warm-up time while avoiding a decrease in the heat-radiation capacity of the radiator.

If the first and second air passages 61 and 62 were not provided, because there would be nowhere for air having passed through the radiator 4 and the condenser 5 to go, not only would new outside air cease to flow through the air inlet 2 into the first space 31 (the engine compartment 3), but there would be a risk of a problem arising of air having passed through the radiator 4 striking the shroud 6 and flowing back toward the air inlet 2.

In the first embodiment, on the other hand, because the second and first air passages 62, 61 for respectively guiding the incoming air to outside the first space 31 (outside the engine compartment 3) and to the second space 32 side are formed, such problem is completely prevented. Therefore, decrease of the heat-radiation capacities of the radiator 4 and the condenser 5 is prevented.

Also, because in the first and second modes a part of the incoming air is blown through the first air passage 61 into the second space 32, even though the engine compartment 3 is divided by the shroud 6, it is no problem for air-cooled auxiliary equipment such as the hydraulic power steering pump 11 to be cooled.

And, because air is blown through the first outlet 61a toward the upper side of the engine 1, the temperature of air taken into the engine 1 can be kept relatively low, and the output of the engine 1 is thereby increased.

Whereas the outer shape of the radiator 4 is substantially rectangular, since the shape of the engine compartment 3 is not necessarily like the outer shape of the radiator 4, it may be difficult for the gaps between the radiator 4 and the inner walls of the engine compartment 3 to be completely sealed. Consequently, with the first and second air passages 61 and 62 alone there would be a risk of air having passed through the radiator 4 flowing back to the upstream side of the radiator 4 through gaps between the radiator 4 and the inner walls of the engine compartment 3.

According to the first embodiment, on the other hand, because there are provided the blowers 71, 72 for forcibly discharging the incoming air to outside the first space 31, even if the sealing of the gaps between the radiator 4 and the inner walls of the engine compartment 3 is incomplete, air having passed through the radiator 4 is prevented from flowing back to the upstream side of the radiator 4. Therefore, decrease in the heat-radiation capacity of the radiator 4 is prevented.

Now, when the ventilation resistance (pressure loss) between the air inlet 2 and the first and second air passages 61 and 62 is considered, because as described above the flow passing through the radiator 4 is adjusted by the bypass passage 31a being opened and closed according to the first embodiment, the ventilation resistance is smaller when the bypass passage 31a is opened than when the bypass passage 31a is closed.

Accordingly, in the first mode, wherein the bypass passage 31a is open, the flow passing through the condenser 5 is larger than it is in the other modes, and thus in the first mode the heat-radiation capacity of the condenser 5 is greater than the other modes.

On the other hand, because in the first mode the load on the engine 1 is small, since normally the engine speed is also not very high, the flow of refrigerant circulating inside the vehicle air-conditioning system (refrigerating cycle) is also smaller, and the cooling capacity (refrigerating capacity) of the system may be decreased. According to the first mode, however, because the heat-radiation capacity of the condenser 5 is increased as described above, excessive decrease of the cooling capacity is suppressed.

And in the second mode, wherein the bypass passage 31a is closed, although since the ventilation resistance is higher than in the first mode the flow passing through the condenser 5 is smaller, because the air that had been passing through the bypass passage 31a now passes through the radiator 4, the flow passing through the radiator 4 increases and the cooling capacity of the radiator 4 increases. Accordingly, when the load on the engine 1 has increased and the cooling water temperature has consequently risen, the cooling capacity of the radiator 4 is increased, and thus the output of the engine 1 is prevented from falling, and the fuel consumption of the engine 1 is improved.

In the second mode, the cooling capacity may be decreased because the flow passing through the condenser 5 decreases. However, since when the load on the engine 1 is large generally the speed of the engine 1 is high and the flow of refrigerant circulating inside the vehicle air-conditioning system (refrigerating cycle) consequently also increases, the decrease of the cooling capacity is reduced.

(Second Embodiment)

In this and the following embodiments, components which are substantially the same as those in previous embodiments are assigned the same reference numerals.

Figure 4:
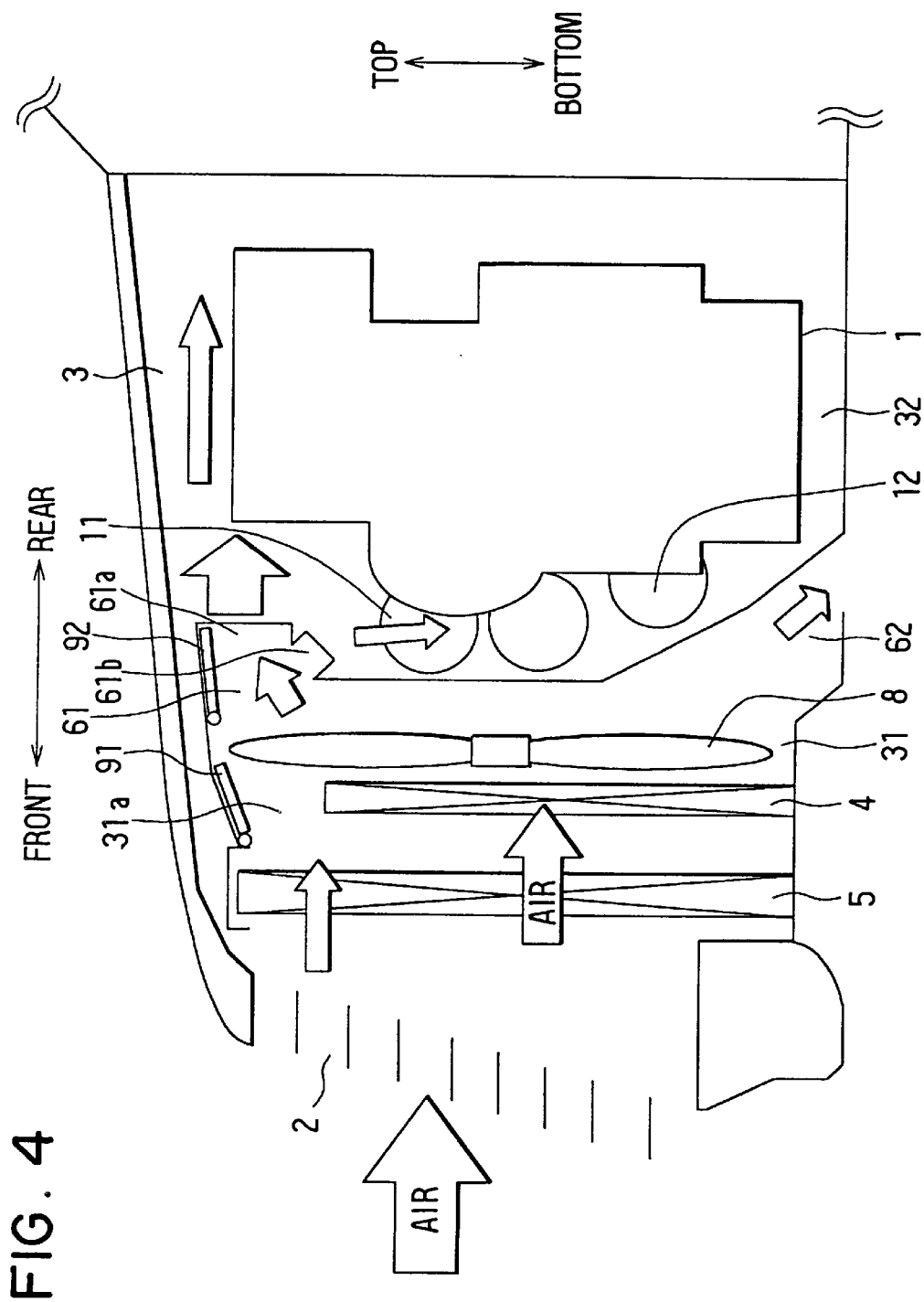
FIG. 4 is a schematic view showing a first mode of an engine cooling apparatus according to a second embodiment of the present invention.
Figure 5:
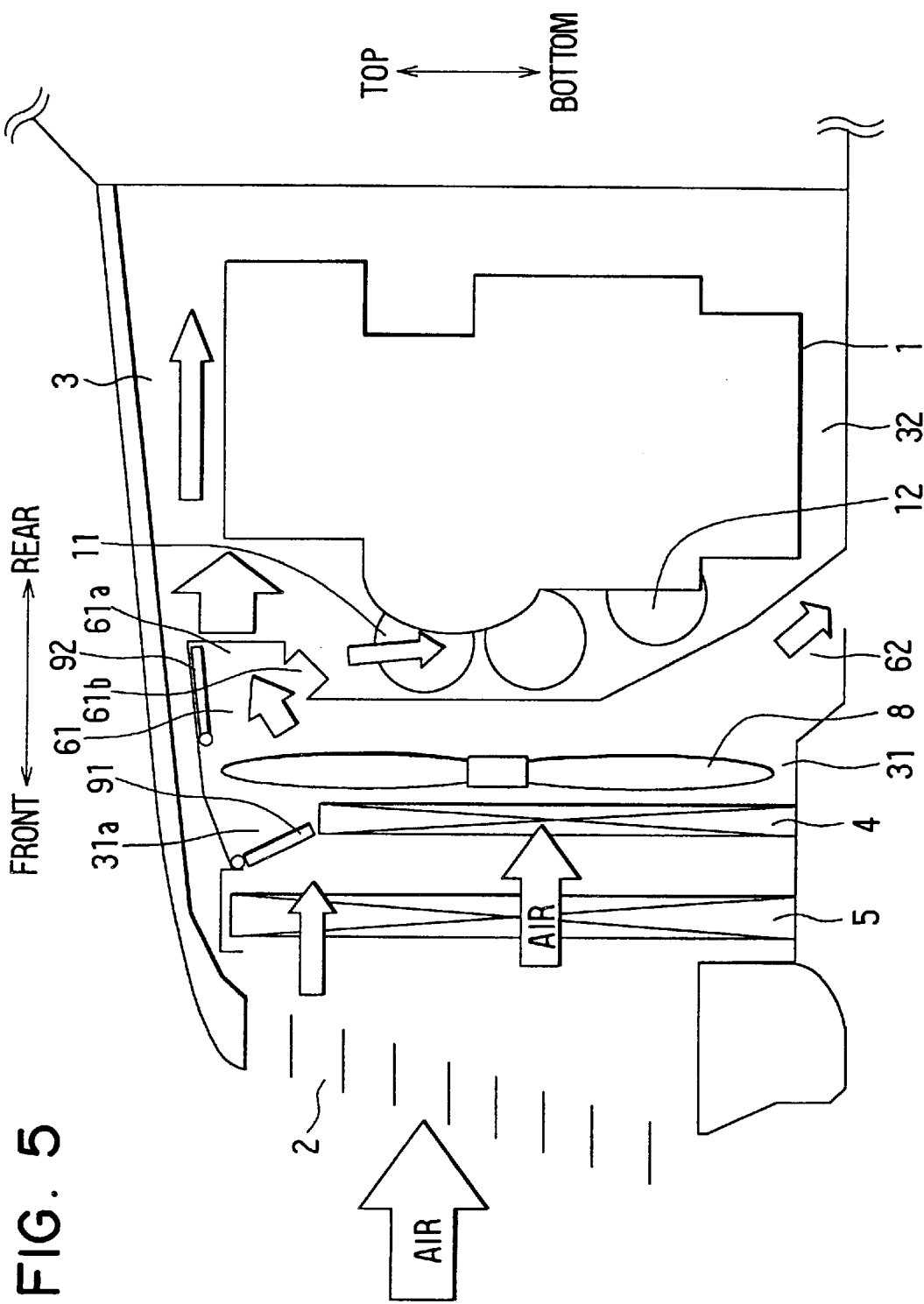
FIG. 5 is a schematic view showing a second mode of the engine cooling apparatus according to the second embodiment.
Figure 6:
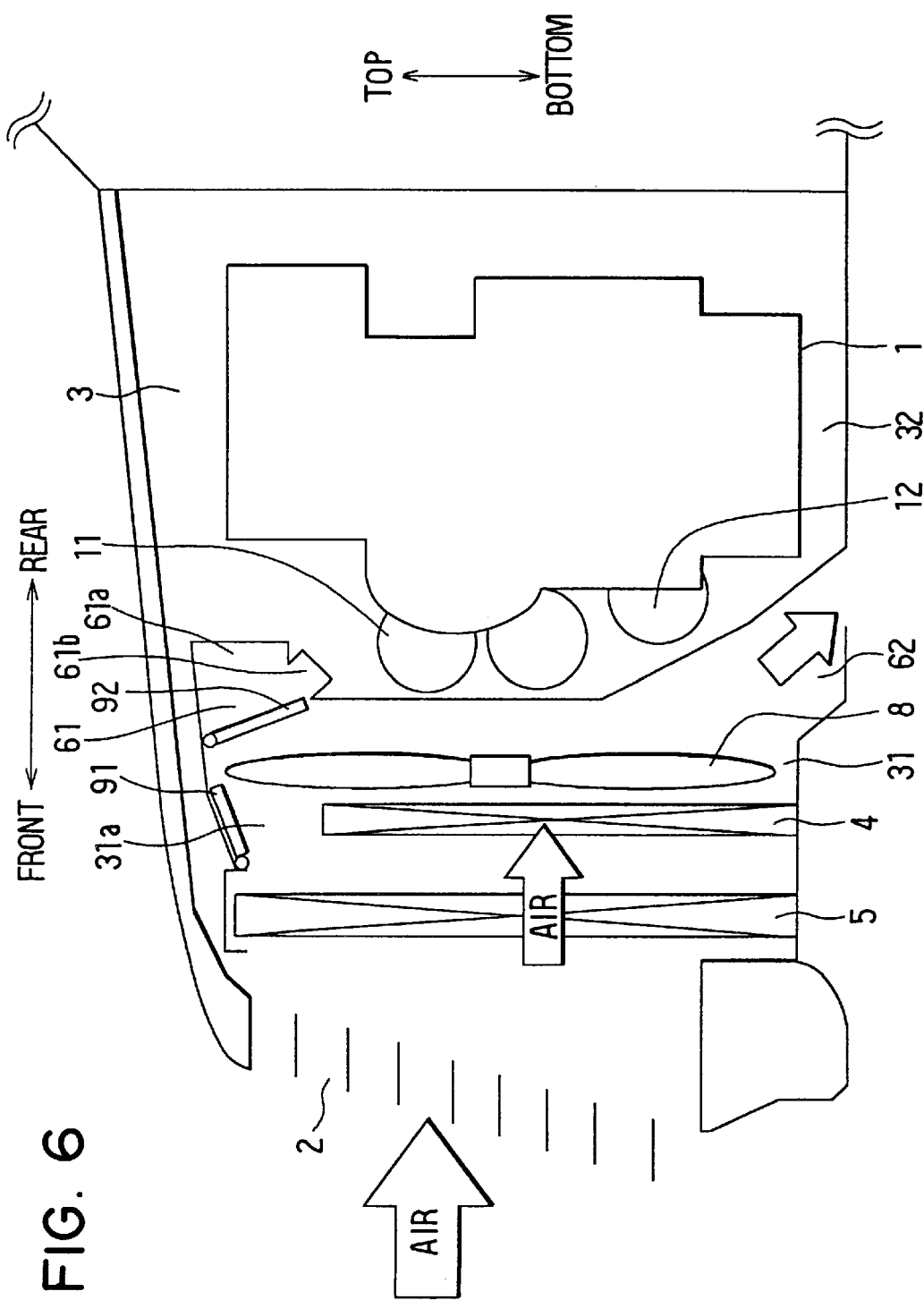
FIG. 6 is a schematic view showing a third mode of the engine cooling apparatus according to the second embodiment.
Figure 7:
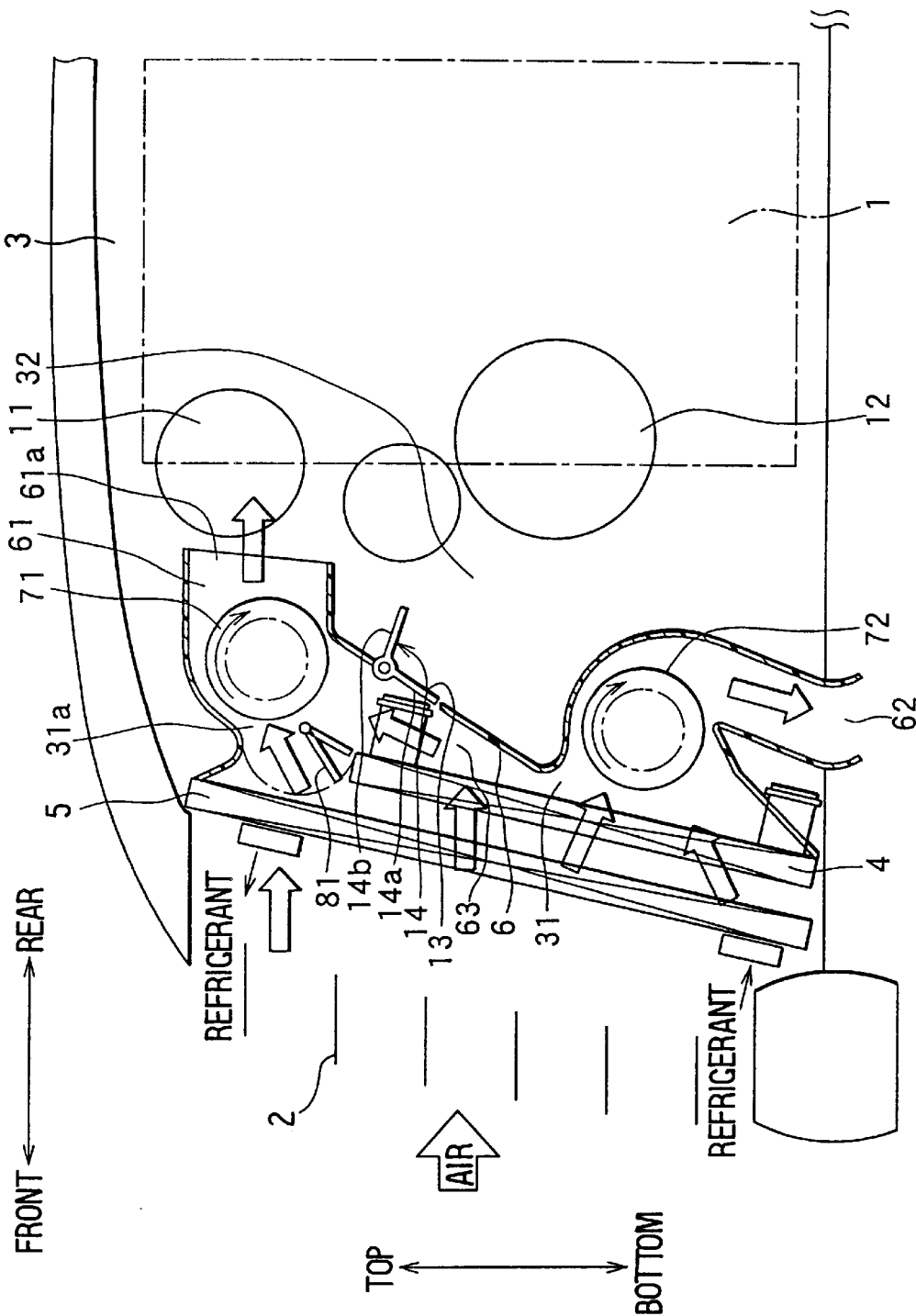
FIG. 7 is a schematic view showing a fourth mode of an engine cooling apparatus according to a third embodiment of the present invention.

Whereas in the first embodiment air discharging means for discharging air to outside the first space 31 was made up of the first and second air passages 61 and 62, a first blower 71 (including the rotary door 71b) and a second blower 72, in this second embodiment the two blowers 71, 72 are omitted, and as shown in FIGS. 4 through 6, air discharging means is instead made up of a single axial-flow fan 8, a first door 91 for opening and closing the bypass passage 31a, and a second door 92 for opening and closing the first air passage 61 (the first and second outlets 61a, 61b).

FIG. 4 shows the first mode of the second embodiment, wherein both of the doors 91 and 92 are open and a part of the incoming air is blown through the first air passage 61 into the second space 32 while the rest is discharged through the second air passage 62 (the lower side of the engine compartment 3) to outside the engine compartment 3.

FIG. 5 shows the second mode of the second embodiment, wherein the bypass passage 31a is closed so that the incoming air passes through the radiator 4, and a part of the air flowing into the third air passage 63 through the radiator 4 is blown through the first air passage 61 into the second space 32 while the rest is discharged through the second air passage 62 (the lower side of the engine compartment 3) to outside the engine compartment 3.

FIG. 6 shows the third mode of the second embodiment, wherein the first air passage 61 (the two outlets 61a, 61b) is closed and the bypass passage 31a is connected with the third air passage 63 so that all the incoming air is discharged through the second air passage 62 (the lower side of the engine compartment 3) to outside the engine compartment 3.

(Third Embodiment)

A third embodiment of the present invention is shown in FIGS. 7 to 10. In the third embodiment, a communication port 13 is formed on the shroud 6 to communicate the first space 31 and the second space 32. Further, a third door 14 for opening and closing the communication port 13 is provided on the shroud 6. The third door 14 includes a first door portion 14a and a second door portion 14b such that the third door 14 has a L-shaped cross section.

Figure 8:
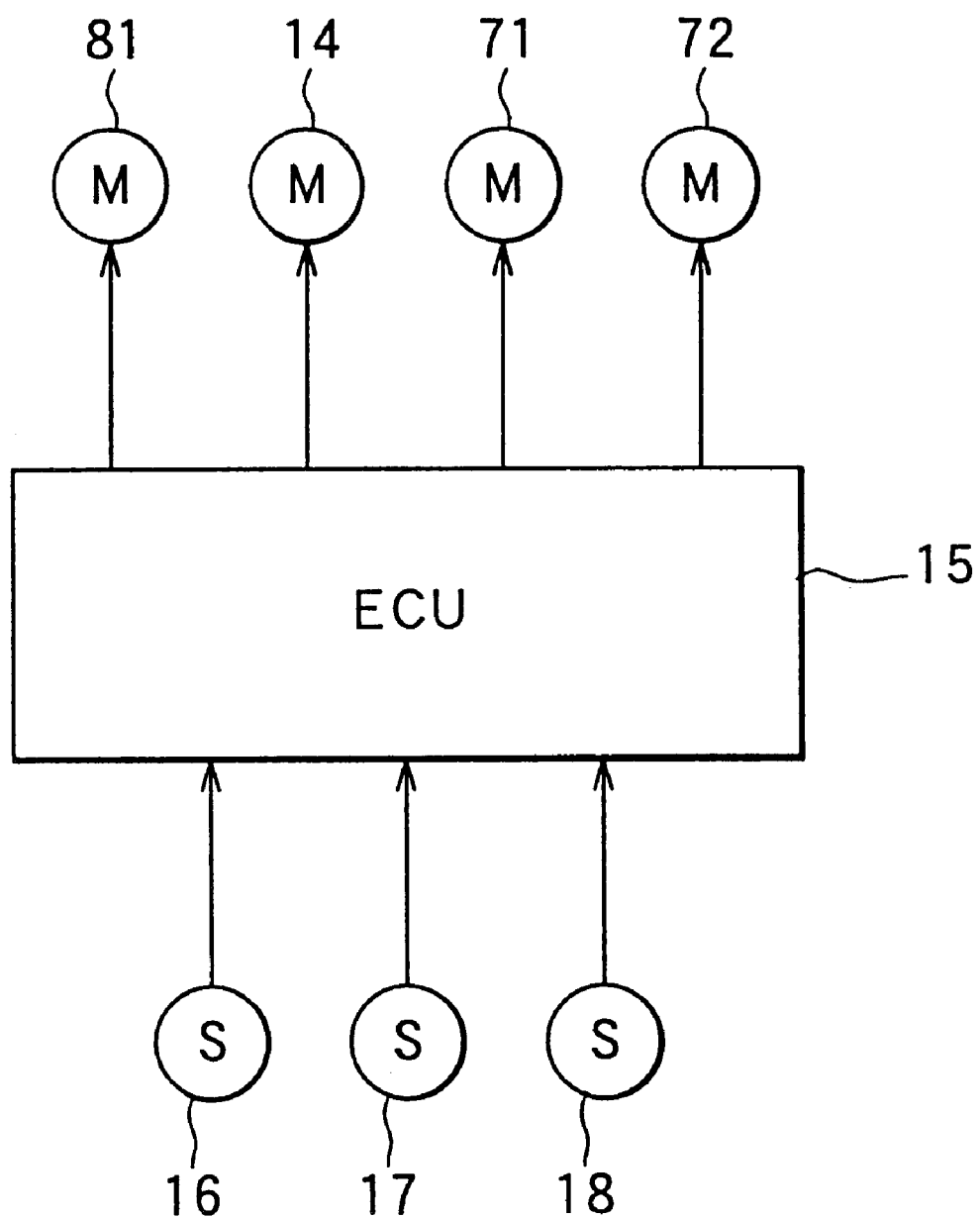
FIG. 8 is a block diagram of a control system of the engine cooling apparatus according to the third embodiment.
Figure 9:
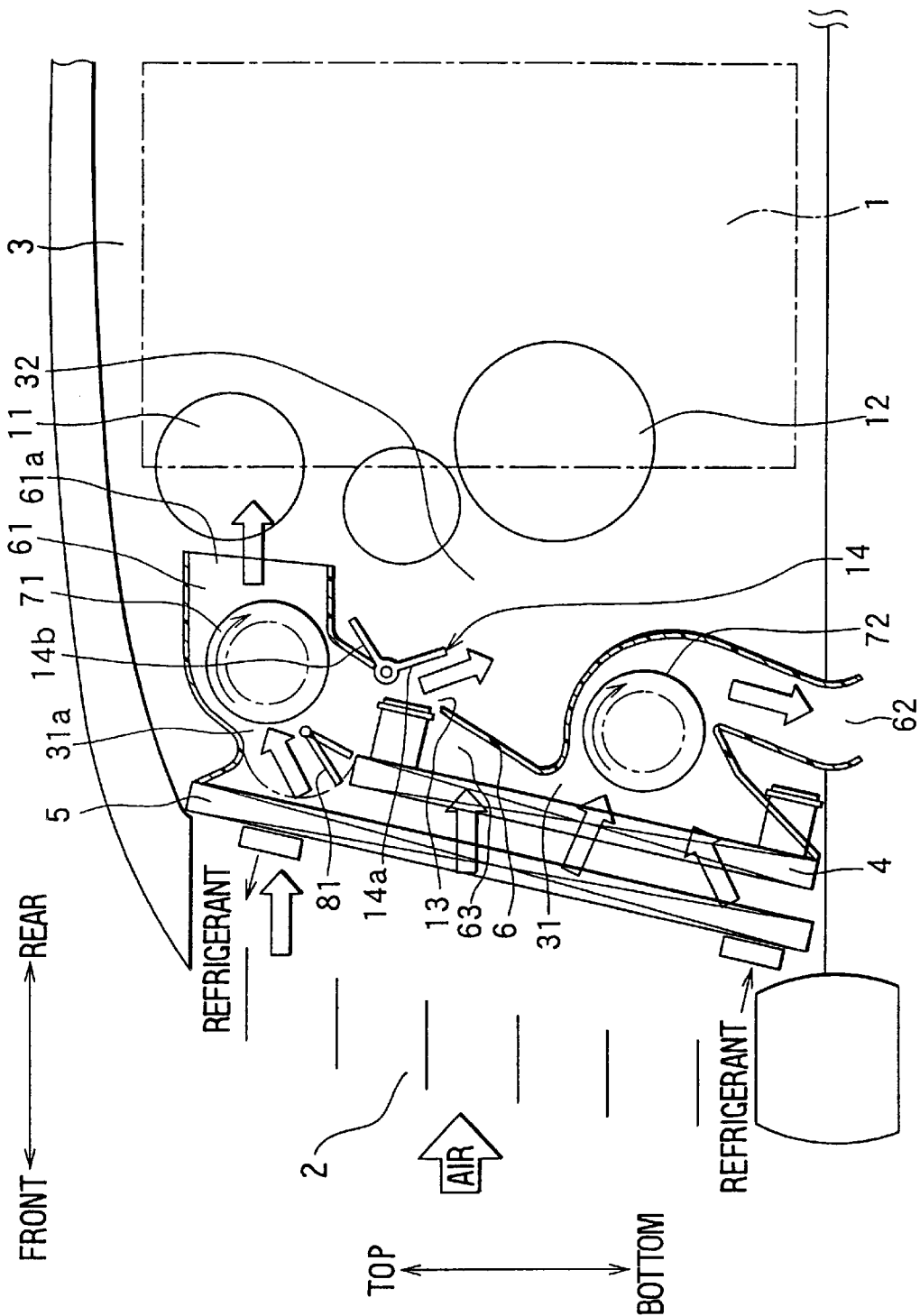
FIG. 9 is a schematic view showing a fifth mode of the engine cooling apparatus according to the third embodiment.
Figure 10:
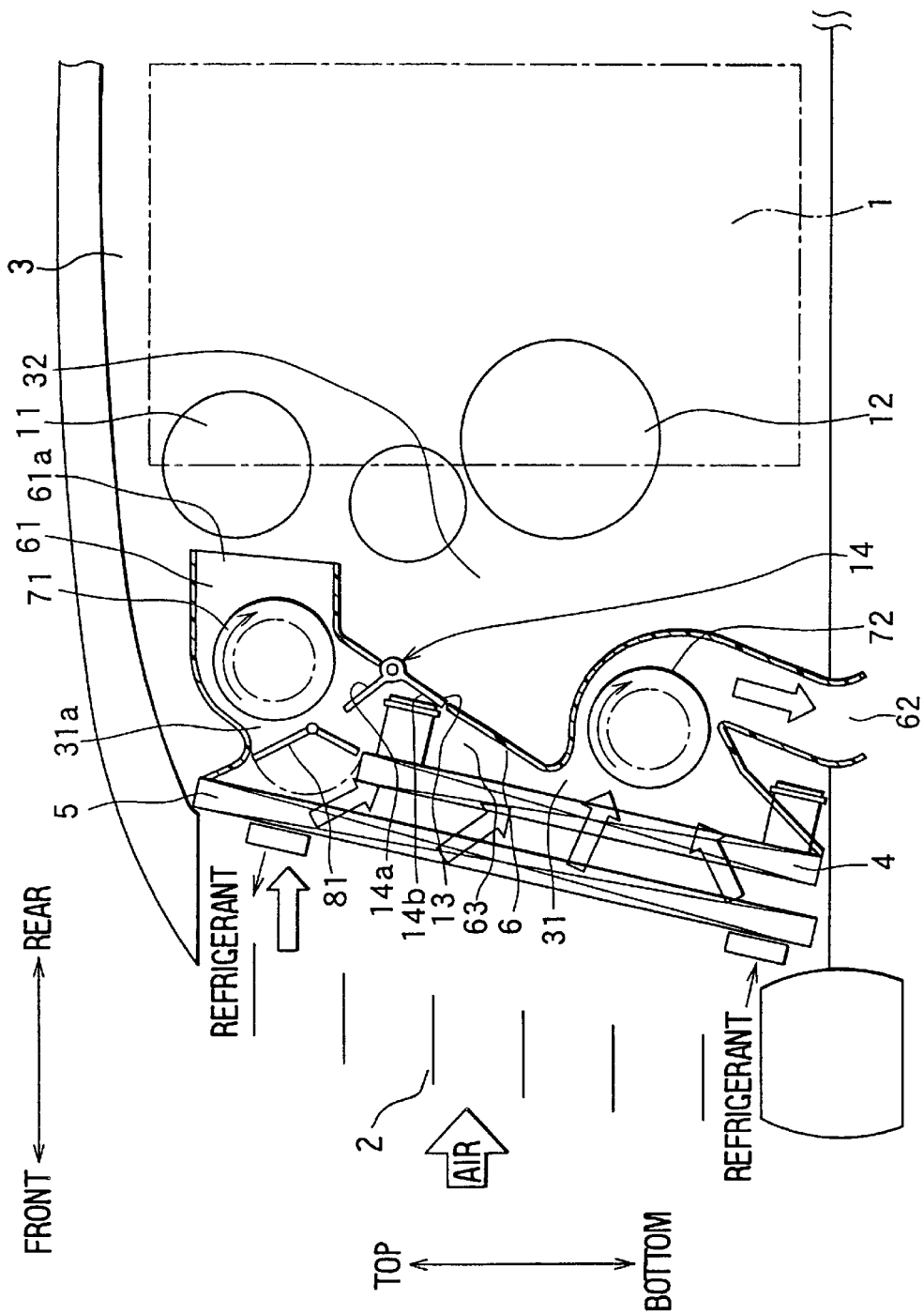
FIG. 10 is a schematic view showing a sixth mode of the engine cooling apparatus according to the third embodiment.

The first door 81, the third door 14 and the blowers 71, 72 are controlled by an electronic control unit (ECU) 15 as shown in FIG. 8. Detected water temperature Tw of a water temperature sensor 16 which is provided on the engine 1 to detect the cooling water temperature, and detected air temperature Ta of an external temperature sensor 17 which is provided on the air inlet 2 to detect the incoming air temperature, and detected speed V of a speed sensor 18 which detects a vehicle speed, are output to the ECU 15.

1. Fourth Mode (see FIG. 7)

This fourth mode is executed at times, such as in spring, summer and autumn, when the outside air temperature Ta is equal to or greater than a predetermined temperature (approximately 20° C. in the third embodiment) and the vehicle speed V is equal to or less than a predetermined speed (20 Km/h in the third embodiment). In this fourth mode, the communication port 13 is closed and the bypass passage 31a is opened.

Accordingly, a part of the incoming air from the air inlet 2 is blown out to the upper side of the second space 32 via the first air passage 61 and the first outlet 61a while rest is blown outside the engine compartment 3 through the second air passage 62.

Like the first and second modes described in the previous embodiments, the first door 81 is controlled according to the engine load. As the engine load increases, the opening degree of the bypass passage 31a decreases to increase the flow amount of the air passing through the radiator 4. Conversely, as the engine load decreases, the opening degree of the bypass passage 31a increases to reduce the flow amount of the air passing through the radiator 4.

2. Fifth Mode (see FIG. 9)

This fifth mode is executed when the outside air temperature Ta is equal to or greater than the predetermined temperature and the vehicle speed V is equal to or less than the predetermined speed. In this fifth mode, the communication port 13 is opened, and the bypass passage 31a is opened by controlling the first door 81 according to the engine load like the fourth mode.

Accordingly, most of the incoming air having passed through the bypass passage 31a is blown out to the upper side of the second space 32 via the first air passage 61 and the first outlet 61a, and a part of the incoming air having passed through the radiator 4 is blown outside the engine compartment 3 through the second air passage 62, while the rest is blown into the second space 32 through the communication port 13.

3. Sixth Mode (see FIG. 10)

This sixth mode is executed when the outside air temperature Ta is low like the above third mode. In the sixth mode, the bypass passage 31a and the communication port 13 are closed, and the incoming air having passed through the radiator 4 is prevented from flowing toward the first air passage 61 by utilizing the third door 14.

Some characterizing features of the third embodiment will now be described.

According to tests and experiences of the inventors of the present invention, in the first and second embodiments, when the vehicle speed increases and the flow amount of the incoming air increases, the incoming air with the shroud 6 is less than that without the shroud 6 because the shroud 6 functions as a ventilation resistance. For example, the inventors found that the incoming air was reduced by approximately 15% at 40 Km/h.

According to the third embodiment, however, when the vehicle speed is equal to or greater than the predetermined speed, the communication port 13 is opened to reduce the ventilation resistance. Accordingly, the decrease of the incoming air is prevented.

When the vehicle speed is equal to or greater than the predetermined speed, a part of the incoming air collides with the engine 1 via the communication port 13. However, since the vehicle speed is equal to or greater than the predetermined speed, the problem that the air returned to the upstream side of the radiator 4 after colliding with the engine 1 passes through the radiator 4 again may not occur.

Furthermore, when the outside air temperature is low, the incoming air does not flow into the second space 32 and is blown outside the engine compartment 3 because the communication port 13 and the bypass passage 31a are closed. Accordingly, the heat radiation from a surface of the engine 1 is suppressed. As a result, the temperature decrease of the engine cooling water is prevented, and the lack of the heating capacity is prevented for a heater core (not shown) which heats the passenger compartments by using the heat of the engine cooling water.

In general, a cross-flow fan has a larger ventilation resistance against the incoming air than an axial-flow fan. Therefore, the decrease amount of the incoming air with the cross-flow fan is greater than with the axial-flow fan. Accordingly, the third embodiment is especially effective for the cross-flow fan.

Although the flow amount of the incoming air is indirectly detected by detecting the vehicle speed in the third embodiment, an air flow amount sensor for directly detecting the flow amount of the incoming air may be used instead.

(Fourth Embodiment)

Figure 11:
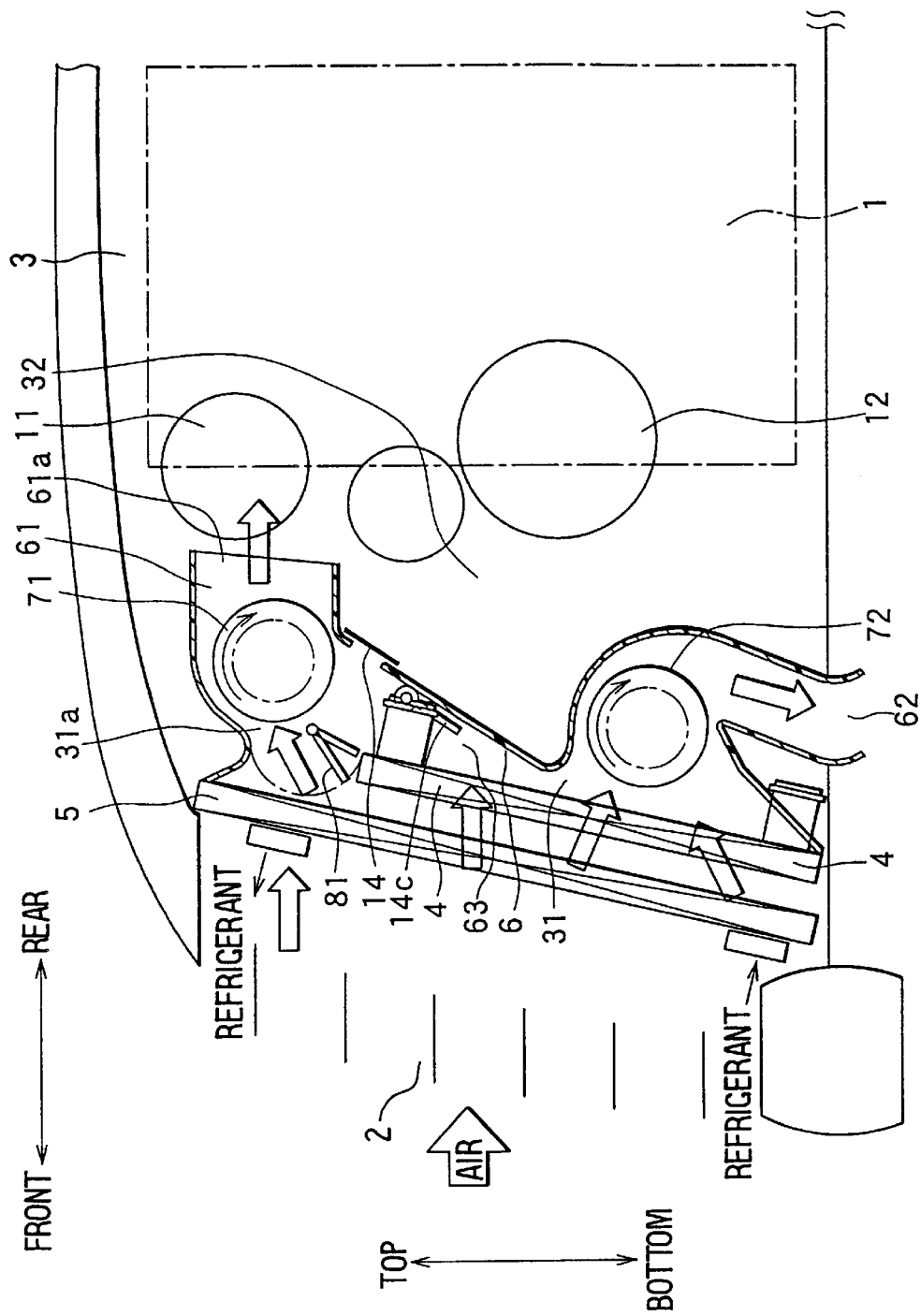
FIG. 11 is a schematic view showing a fourth mode of an engine cooling apparatus according to a fourth embodiment of the present invention.
Figure 12:
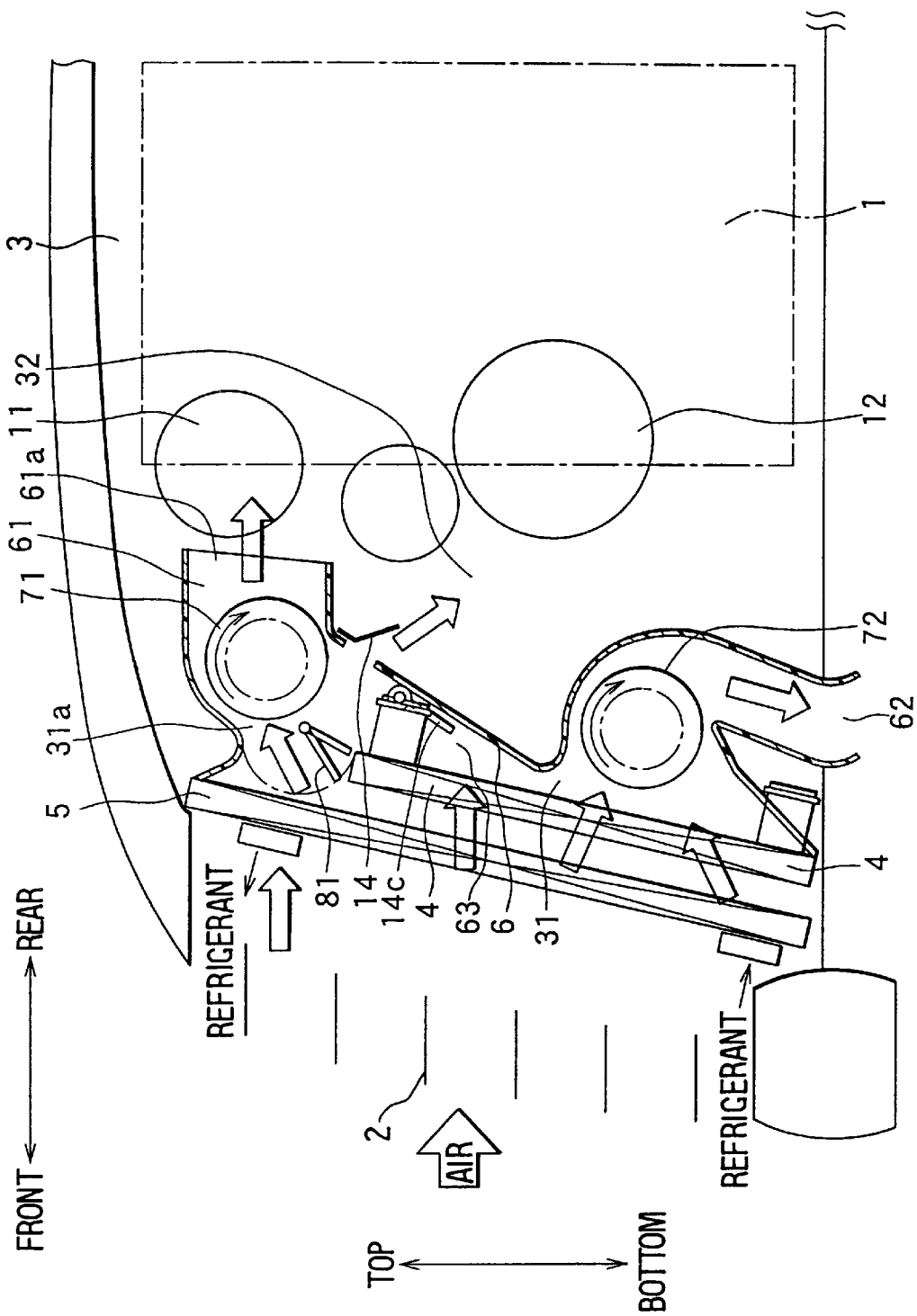
FIG. 12 is a schematic view showing a fifth mode of the engine cooling apparatus according to the fourth embodiment.
Figure 13:
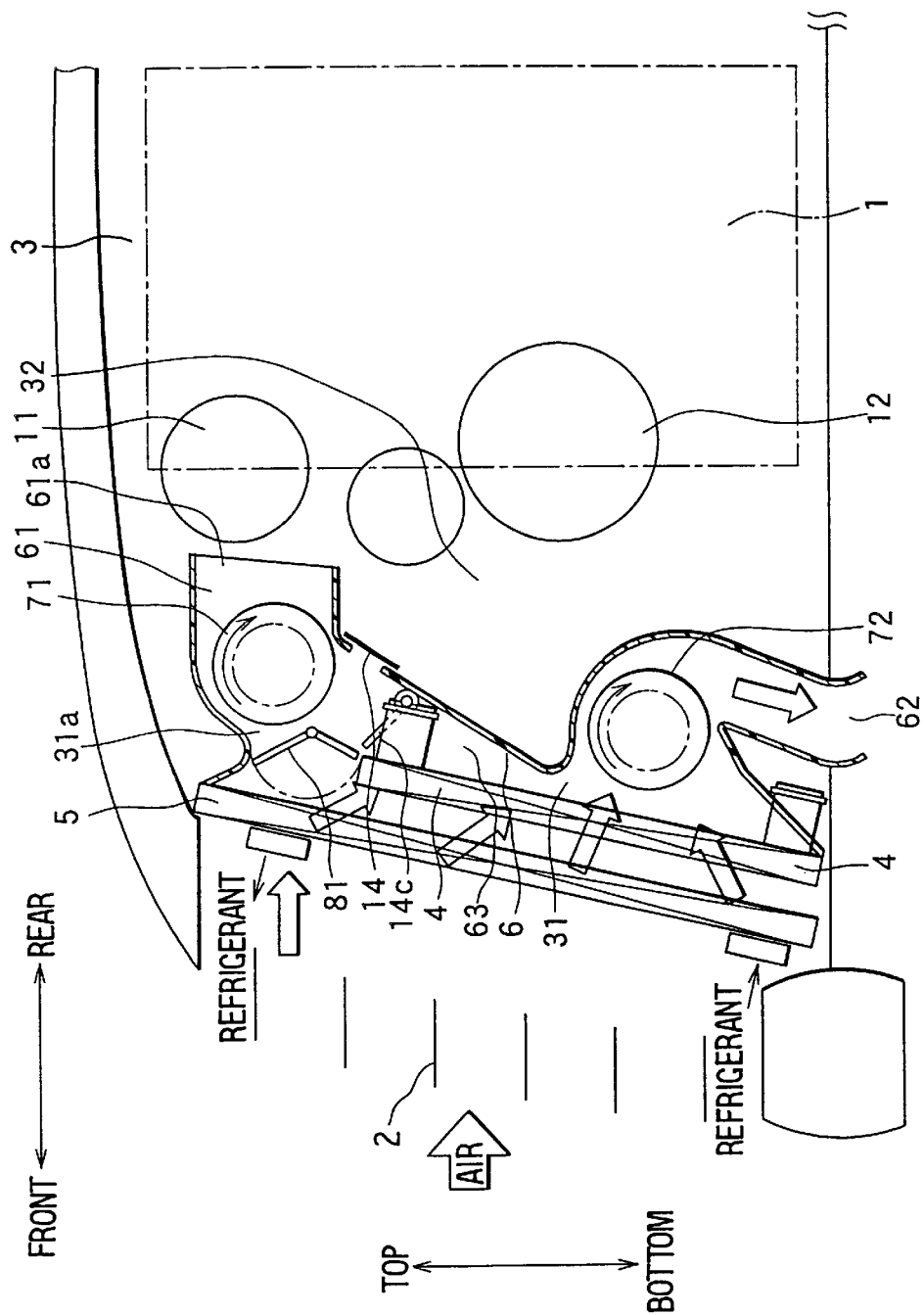
FIG. 13 is a schematic view showing a sixth mode of the engine cooling apparatus according to the fourth embodiment.

A fourth embodiment of the present invention is shown in FIGS. 11 to 13.

Although the third door 14 is controlled by a driving means, such as a servomotor, based on the vehicle speed in the third embodiment, the third door 14 is made of an elastic material, such as rubber, in the fourth embodiment. According to the fourth embodiment, the rubber-made third door 14 is formed such that it automatically opens when the dynamic pressure (wind pressure) of the incoming air applied to the third door 14 is equal to or greater than a predetermined pressure, and it automatically closes when the dynamic pressure of the incoming air applied to the third door 14 is less than the predetermined pressure.

FIG. 11 shows the fourth mode, FIG. 12 shows the fifth mode, and FIG. 13 shows the sixth mode of the fourth embodiment. A fourth door 14c is provided to prevent the air flow having passed through the radiator 4 from flowing toward the first air passage 61 during the sixth mode.

The third door 14 may include a leaf spring or a torsion coil spring for opening and closing the communication port 13.

(Fifth Embodiment)

Figure 14:
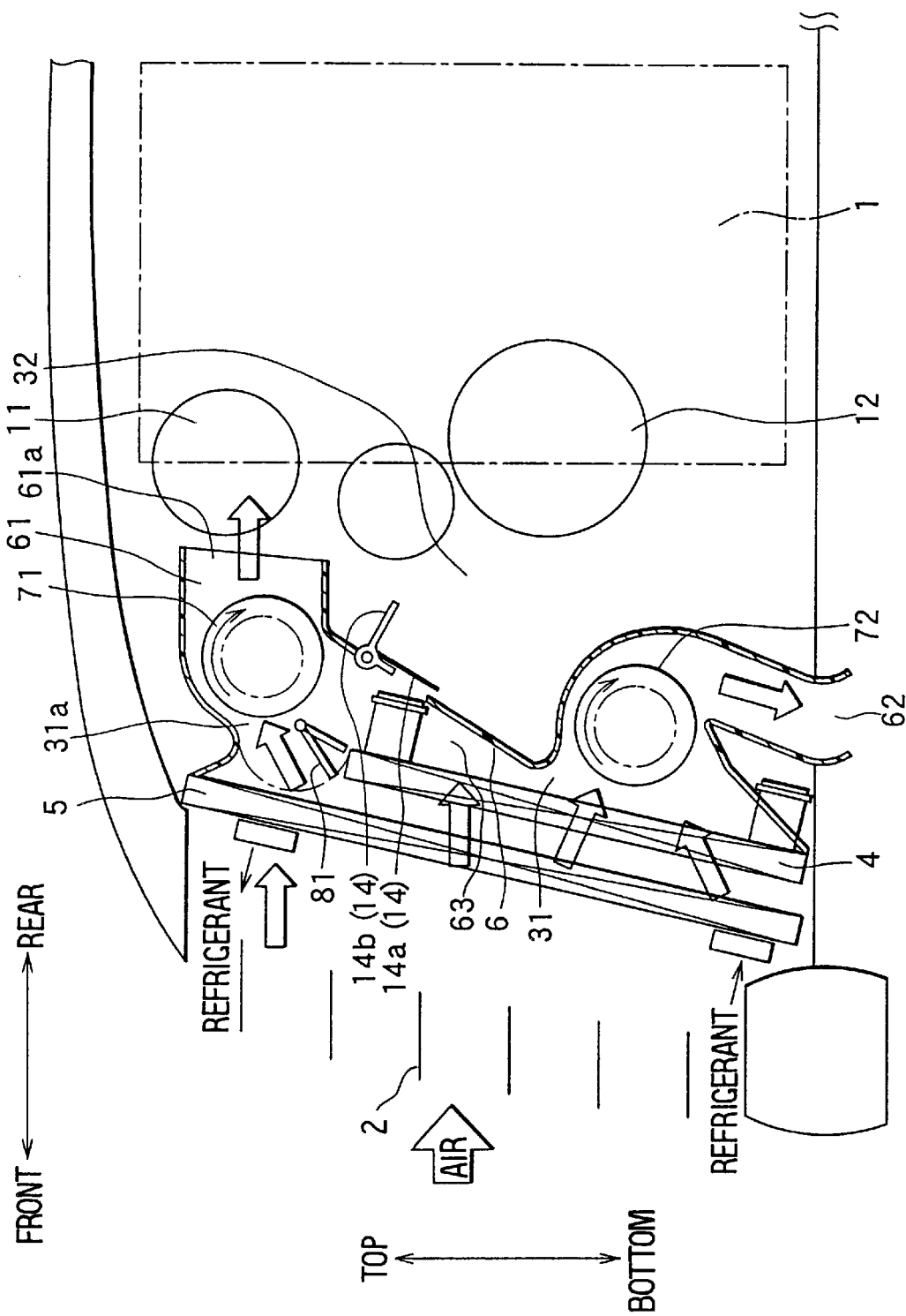
FIG. 14 is a schematic view showing a fourth mode of an engine cooling apparatus according to the fifth embodiment of the present invention.

A fourth embodiment of the present invention is shown in FIGS. 14 to 16. FIG. 14 shows the fourth mode, FIG. 15 shows the fifth mode, and FIG. 16 shows the sixth mode of the fifth embodiment.

In the fifth embodiment, the first door portion 14a of the third door 14 is made of an elastic material like the fourth embodiment, and the second door portion 14b of the third door 14 is made of a rigid body, such as resin or metal.

Although in the first through fifth embodiments described above the first and second air passages 61 and 62 were formed respectively at the top and bottom of the engine compartment 3, the first and second air passages 61 and 62 may alternatively be formed in other locations such as respectively in the left and right of the engine compartment 3.

Furthermore, the first air passage 61 may be formed in the lower side of the engine compartment 3, and the second air passage 62 may be formed in the upper side of the engine compartment 3.

(Sixth Embodiment)

A sixth embodiment of the present invention is shown in FIGS. 17 to 21.

Referring to FIG. 17, the reference numeral 51 represents a condenser for cooling and condensing a refrigerant circulating inside the refrigerating cycle (not shown) in a vehicle.

The condenser 51 is positioned on the upstream side of the radiator 4 in the air flow, and above the condenser 51 is mounted a subcooler 52 for further cooling and thereby increasing the degree of subcooling of the refrigerant flowing out of the condenser 51.

Consequently, in the sixth embodiment, refrigerant flows into the condenser 51 through a refrigerant inlet 51a formed in the lower side of the condenser 51 and flows out through a refrigerant outlet 52a of the subcooler 52. The condenser 51 and the subcooler 52 are integrated and hereinafter will be referred to together as the heat exchanger 105.

The radiator 4 has a cooling water inlet 41 and a cooling water outlet 42.

A first opening 161 facing the upper side of the engine 1 and second openings 162 facing engine auxiliaries 7a through 7c, such as an alternator (generator), connected to the engine 1 are formed in the upper side of the shroud 6, while a third opening 163 facing the road surface outside the engine compartment 3 is formed in the lower side of the shroud 6.

Figure 18A:
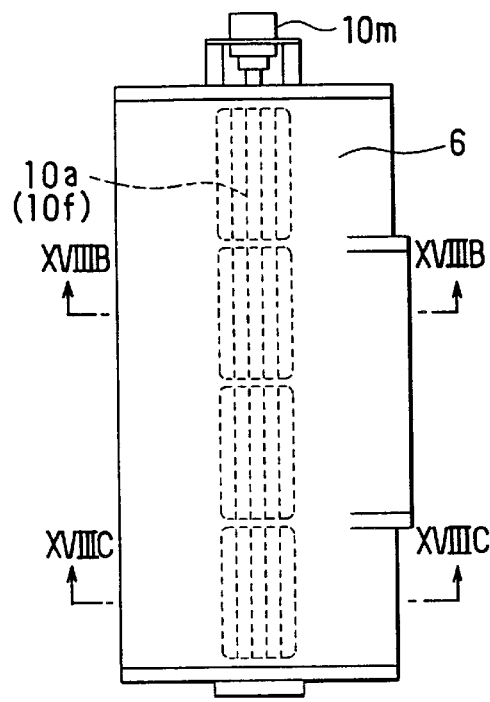
FIG. 18A is a front view of a first blower according to the sixth embodiment.
Figure 18B:
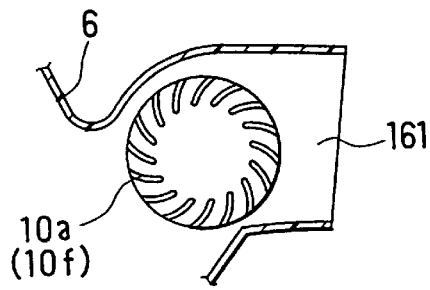
FIG. 18B is a sectional view taken on the lines A—A in FIG. 18A.
Figure 18C:
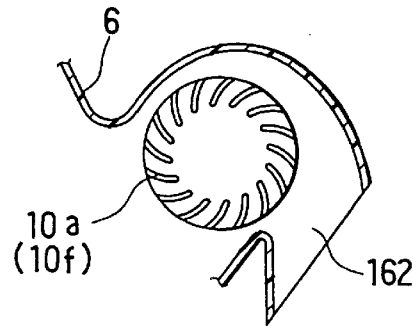
FIG. 18C is a sectional view taken on the lines B—B in FIG. 18A.

The first and second openings 161 and 162, as shown in FIGS. 18A through 18C, are formed alternately in the axial direction of a first blower 10a such that the first opening 161 is in the axial direction middle of the first blower 10a and the second openings 162 are at the axial direction ends of the first blower 10a. The third opening 163 extends along substantially the full axial direction length of a second blower 10b, which will be further described later.

Also, as shown in FIG. 17, in a part of the first space 31 in the shroud 6 that is above the radiator 4 there is formed a bypass passage 31a for guiding a part of the incoming air to the first and second openings 161, 162 (toward the second space 32 in which the engine 1 is mounted) so that it bypasses the radiator 4, and this bypass passage 8 is opened and closed by a first door 9. A projecting wall 191, projecting inwardly in the shroud 6, blocks a gap between the pivoting center of the first door 9 and the upper end 4a of the radiator 4.

A first blower 10a forcibly blows the incoming air passing through the bypass passage 31a and a part of the incoming air passing through the radiator 4 through the first and second openings 161, 162 to the second space 32. A second blower 10b forcibly blows the rest of the incoming air passing through the radiator 4 to outside the engine compartment 3 through the third opening 163.

As shown in FIGS. 18A through 18C, the blowers 10a, 10b are made up of cross-flow fans 10f wherein air passes through a cross-section perpendicular to the axis of a multivane impeller and electric motors (driving means) 10m for driving the cross-flow fans 10f.

In FIG. 17, a second door 112 opens and closes a passage through which the incoming air having passed through the radiator 4 is taken into the first blower 10a, and the doors 9 and 112 are both pivoted by driving means such as servo motors.

Figure 19:
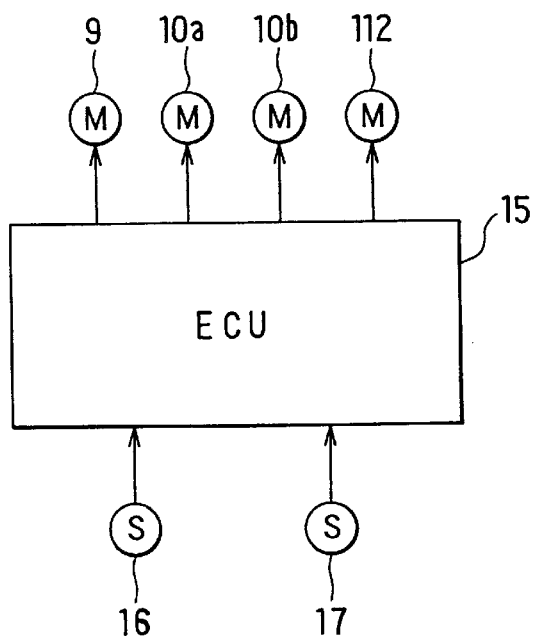
FIG. 19 is a control block diagram of the engine cooling apparatus according to the sixth embodiment.

The operations of the doors 9, 112 and the blowers 10a, 10b are controlled by an electronic control unit (ECU) 15 shown in FIG. 19, and into this ECU 15 are inputted a temperature Tw detected by a water temperature sensor 16, provided on the engine 1, detecting the cooling water temperature, and a temperature Ta detected by an outside air temperature sensor 17, disposed at the air inlet 2, detecting the temperature of the incoming air.

The operation of this sixth embodiment will now be described.

1. First Mode (see FIG. 17)

This first mode is executed at times, such as in summer, when the outside air temperature is high, and at times when the load on the engine 1 (and consequently the amount of heat produced thereby) is small and therefore not much heat-radiation capacity is required of the radiator 4. In the sixth embodiment specifically this first mode is executed when the temperature Ta detected by the outside air temperature sensor 17 is equal to or greater than the predetermined temperature Ta0 and the temperature Tw detected by the water temperature sensor 16 is less than the predetermined temperature Tw0.

In the first mode, both of the doors 9 and 112 are opened, and both of the blowers 10a, 10b are operated, whereby a part of the incoming air is blown through the first and second openings 161, 162 toward the second space 32 and the rest is blown through the third opening 163 to outside the engine compartment 3.

In the sixth embodiment, because as shown in FIG. 17 the heat-radiation area (core area) of the condenser 51 and that of the radiator 4 are approximately the same and the subcooler 52 is mounted on the upper side of the condenser 51, the upper end 5a of the heat exchanger 105 (the upper end of the subcooler 52) is positioned above the upper end 4a of the radiator 4.

Consequently, most of the incoming air which passes through the subcooler 52 (the upper part of the heat exchanger 105) does not pass through the radiator 4 but rather goes via the bypass passage 31a and is blown through the first and second openings 161, 162 toward the second space 32.

The heat-radiation area (core area) referred to here is the projected area of the heat-radiation core parts (parts consisting of fins and tubes) of the radiator 4 and the condenser 51 when projected onto a plane substantially perpendicular to the incoming air flow.

2. Second Mode (see FIG. 20)

This second mode is executed at times, such as in summer, when the outside air temperature is high and also the load on the engine 1 has increased, and in this sixth embodiment specifically the second mode is executed when the detected temperature Ta is equal to or greater than the predetermined temperature Ta0 and the detected temperature Tw is equal to or greater than the predetermined temperature Tw0.

In the second mode, the first door 9 is closed, the second door 112 is opened, and both of the blowers 10a, 10b are operated. As a result, the incoming air which had been bypassing the radiator 4 now passes through the radiator 4, and a part of the air passing through the radiator 4 is blown through the first and second openings 161, 162 into the second space 32 while the rest is blown through the third opening 163 to outside the engine compartment 3.

In the sixth embodiment, because the load on the engine 1 is detected on the basis of the cooling water temperature, this second mode is executed even at times of hot soaking (such as when immediately after a period of high-speed travel the vehicle is stopped with the engine 1 in an idling state).

3. Third Mode (see FIG. 21)

This third mode is executed at times, such as in winter, when the outside air temperature is low, and in the sixth embodiment specifically the third mode is executed when the temperature Ta detected by the outside air temperature sensor 17 is less than the predetermined temperature Ta0.

In the third mode, both of the doors 9 and 112 are closed and both of the blowers 10a, 10b are stopped.

Some characteristic features of this sixth embodiment will now be explained.

According to the sixth embodiment, because there is formed the bypass passage 31a bypassing the radiator 4, compared to an apparatus wherein a bypass passage is formed on the lower side of the heat exchanger as in the aforementioned related art apparatus, the heat-radiation area of the heat exchanger 105 can be made larger. Thus, because the heat-radiation capacity of the heat exchanger 105 is prevented from falling, the compression work of the refrigerating cycle can be prevented from increasing.

Now, in this preferred embodiment, because the bypass passage 31a is formed alongside the radiator 4, there may be a risk of the heat-radiation area of the radiator 4 being small and the heat-radiation capacity of the radiator 4 consequently falling.

However, the heat-radiation capacity required of the radiator 4 fluctuates with the load state of the engine 1 and is not constant. That is, at times when the engine load is large, such as when traveling uphill, a large heat-radiation capacity is required, and at times when the engine load is small, such as during normal travel, a smaller heat-radiation capacity is sufficient.

However, in this sixth embodiment, because when the cooling water temperature has risen to the predetermined temperature Tw0 or above it is inferred that the load on the engine 1 has reached or exceeded the predetermined value and the bypass passage 31a (the first door 9) is closed and the flow passing through the radiator 4 is thereby increased, even at times when the engine load is high, such as during uphill travel, deficiency of the heat-radiation capacity of the radiator 4 is prevented.

As described above, according to the sixth embodiment it is possible to prevent an increase in the compression work of the refrigerating cycle and thereby reduce the power consumption of the refrigerating cycle while still securing the heat-radiation capacity required for the engine 1.

When the outside air temperature is relatively high (first and second modes), because a part of the incoming air is guided around the radiator 4 to the second space 32 on the engine 1 side so that it bypasses the radiator 4, air that has not been heated by the radiator 4 is taken into the engine 1. Thus, because it is possible to lower the intake air temperature of the engine 1 and thereby increase the density of the intake air (oxygen), the output of the engine 1 is improved.

Because the air intake opening is normally located in the upper side of the engine compartment 3, to ensure that low-temperature intake air is taken in to the engine 1 it is desirable to lower the air temperature in the upper side of the second space 32 in which the engine 1 is disposed.

According to the sixth embodiment, because the bypass passage 31a is formed on the upper side of the radiator 4, air which has not been heated by the radiator 4 is guided into the upper side of the second space 32 and thus the output of the engine 1 is improved further.

Furthermore, because the heat exchanger 105 is so constructed that refrigerant flows in through the lower side of the heat exchanger 105 and flows out through the upper side, when the temperature distribution of the heat exchanger 105 is considered, the temperature of the heat exchanger 105 (and the refrigerant) decreases with progress toward the upper side.

Therefore, the temperature increase of the incoming air passing through the upper side of the heat exchanger 105 can be made small, and consequently it is possible to further decrease the temperature of the air blown into the second space 32 via the bypass passage 31a, and the output of the engine 1 is improved further.

Also, because the load on the engine 1 is detected on the basis of the cooling water temperature, not only of course when the load on the engine 1 is actually high but also during hot soaking it is possible for the air flow delivered to the radiator 4 to be increased, and thus the cooling water temperature is prevented from increasing excessively during hot soaking. Thus it is possible to improve fuel consumption during idling (hot soaking).

And because the shroud 6 constituting a dividing wall dividing the engine compartment 3 into the first space 31 and the second space 32 is provided between the radiator 4 and the engine 1, incoming air passing through the radiator 4 can be prevented from directly striking the engine 1. Therefore, for example in winter and at times of cold starting (starting when the engine 1 is cold) since the engine 1 is not cooled by incoming air, warm running is promoted.

Also, since air passing through the radiator 4 can be prevented from directly striking the engine 1, the phenomenon of air having struck the engine 1 passing around to the upstream side of the radiator 4 through gaps between the sides of the engine compartment 3 and the radiator 4 can be prevented. Therefore, air having been heated by the radiator 4 and the engine 1 can be prevented from passing through the radiator 4 again and the heat-radiation capacity of the radiator 4 can thereby be prevented from falling.

That is, with a cooling apparatus for a vehicle according to this preferred embodiment, it is possible to shorten the engine warm-up time while avoiding a decrease in the heat-radiation capacity of the radiator.

If the first through third openings 161 to 163 were not formed, because there would be nowhere for air having passed through the heat exchanger 105 and the radiator 4 to go, not only would new outside air cease to flow through the air inlet 2 into the first space 31 (the engine compartment 3), but there would be a risk of a problem arising of air having passed through the radiator 4 striking the shroud 6 and flowing back toward the air inlet 2.

According to the sixth embodiment, however, because the first through third openings 161 to 163 for blowing the incoming air to outside the first space 31 (outside the engine compartment 3) and to the second space 32 side are provided, such problem is completely prevented. Therefore, the heat-radiation capacities of the radiator 4 and the heat exchanger 105 are prevented from falling.

Also, because in the first and second modes some of the incoming air is blown through the second opening 162 toward the engine auxiliaries 7a through 7c, even though the engine compartment 3 is divided by the shroud 6, it is possible for the air-cooled engine auxiliaries 7a through 7c to be cooled.

Whereas the outer shape of the radiator 4 generally is substantially rectangular, since the shape of the engine compartment 3 is not necessarily like the outer shape of the radiator 4, it may be difficult for the gaps between the radiator 4 and the inner walls of the engine compartment 3 to be completely sealed. Consequently, with the provision of the first through third openings 161 to 163 alone there would be a risk of air having passed through the radiator 4 flowing back to the upstream side of the radiator 4 through gaps between the radiator 4 and the inner walls of the engine compartment 3.

According to the sixth embodiment, on the other hand, because there are provided the first and second blowers 10a, 10b for forcibly discharging incoming air to outside the first space 31, even if sealing of the gaps between the radiator 4 and the inner walls of the engine compartment 3 is incomplete, air having passed through the radiator 4 can be prevented from flowing back to the upstream side of the radiator 4. Therefore, it is possible to surely prevent the heat-radiation capacity of the radiator 4 from falling.

Now, when the ventilation resistance (pressure loss) between the air inlet 2 and the first through third openings 161 to 163 is considered, according to the sixth embodiment, because as described above the flow passing through the radiator 4 is adjusted by the bypass passage 31a being opened and closed, this ventilation resistance is smaller when the bypass passage 31a is open than when the bypass passage 31a is closed.

Accordingly, in the first mode, wherein the bypass passage 31a is open, the flow passing through the heat exchanger 105 is larger than it is in the other modes, and thus in the first mode the heat-radiation capacity of the heat exchanger 105 can be increased compared to the other modes.

On the other hand, because in the first mode the load on the engine 1 is small and normally the engine speed is also relatively low, the amount of the refrigerant circulating inside the refrigerating cycle is smaller, and there is a risk of the cooling capacity (refrigerating capacity) of the air-conditioning system falling. However, in the first mode, because the heat-radiation capacity of the heat exchanger 105 is increased as described above, excessive falling of the cooling capacity is suppressed.

In the second mode, there is a risk of a decrease in the cooling capacity because the flow passing through the heat exchanger 105 decreases. However, since when the load on the engine 1 is large generally the speed of the engine 1 is high and the flow of refrigerant circulating inside the refrigerating cycle consequently also increases, the cooling capacity does not decrease greatly.

(Seventh Embodiment)

Figure 23A:
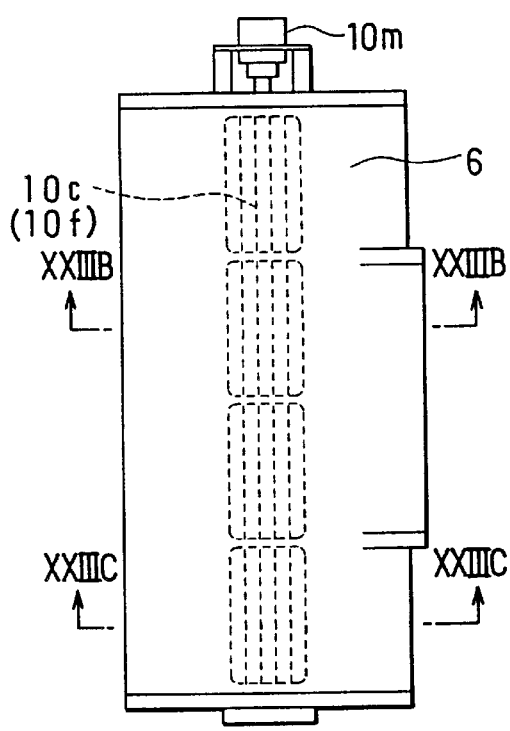
FIG. 23A is a front view of a third blower according to the seventh embodiment.
Figure 23B:
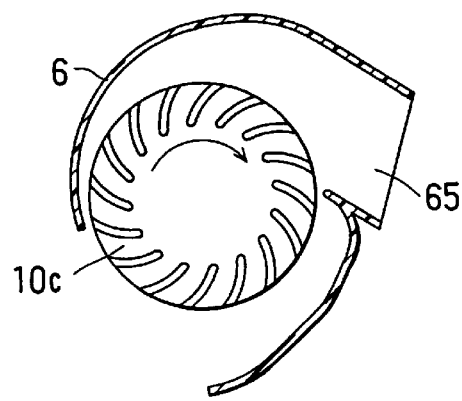
FIG. 23B is a sectional view taken on the lines A—A in FIG. 23A.
Figure 23C:
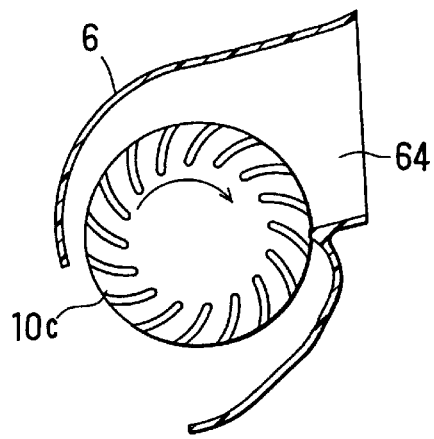
FIG. 23C is a sectional view taken on the lines B—B in FIG. 23A.
Figure 24:
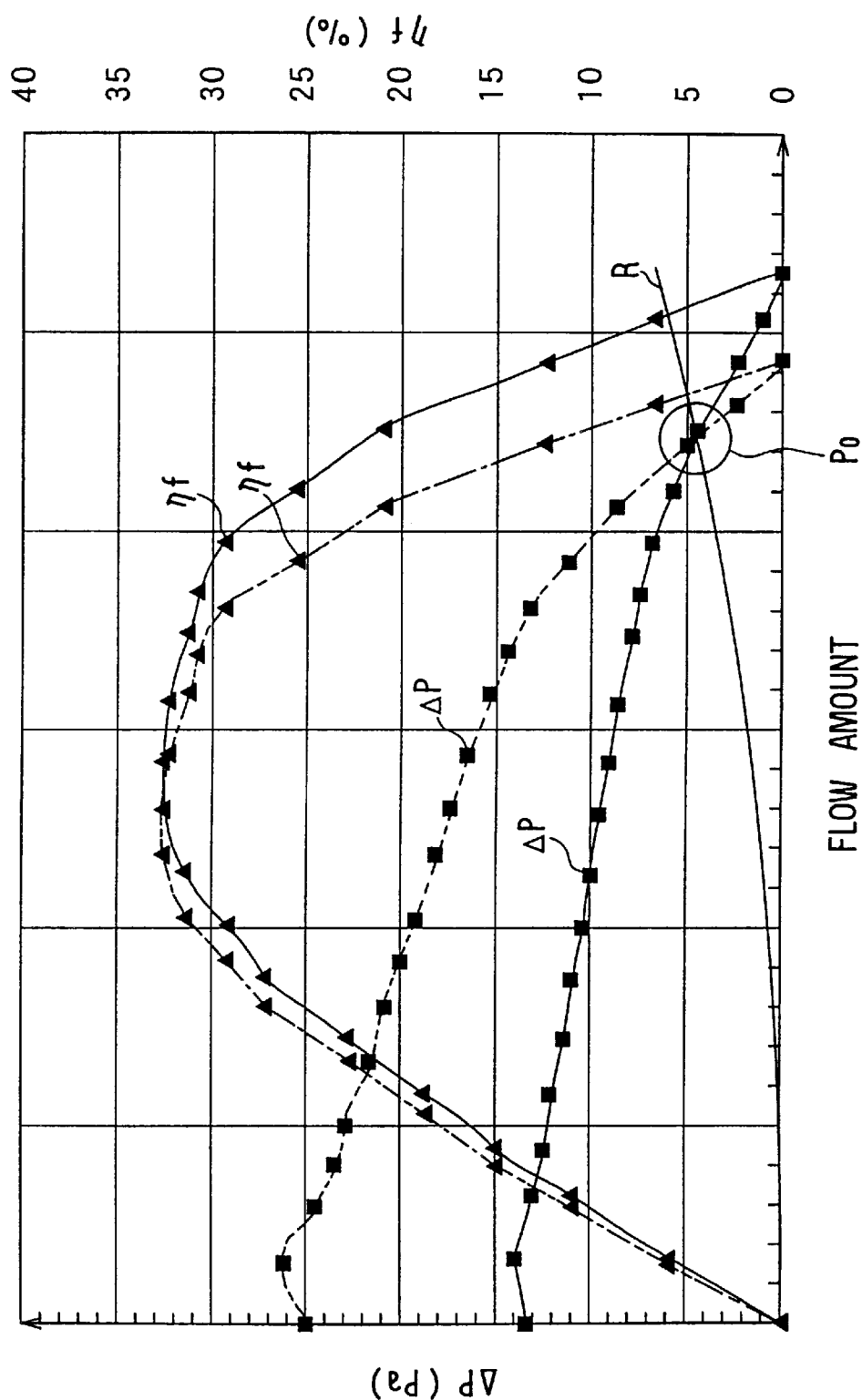
FIG. 24 is a graph showing characteristics of blowers in the sixth and seventh embodiments.

A seventh embodiment of the present invention is shown on FIGS. 22 to 24.

According to the previous embodiments described above, first and second blowers 10a, 10b having cross-flow fans 10f were used to take in and deliver the incoming air, but experimental researches carried out by the present inventors have revealed that depending on the characteristics of the fans 10f there is a possibility that the power consumed by the blowers 10a, 10b may become excessively great.

To overcome this, in this seventh embodiment, as shown in FIG. 22, a third blower 10c is provided between the first and second blowers 10a and 10b, and the shroud 6 is so formed that air taken in by the first blower 10a is blown through the first opening 161 toward the upper side of the second space 32 and, as shown in FIGS. 22 and 23, air taken in by the third blower 10c is blown through a fourth opening 64 and a fifth opening 65 toward the upper side and the lower side of the engine 1 respectively.

FIG. 24 shows characteristics of the blower used in the engine cooling apparatus of the sixth embodiment (dashed lines) and characteristics of the blower used in the engine cooling apparatus of the seventh embodiment (solid lines). ΔP represents a total pressure of the blowers, and ηf represents fan efficiency. As is clear from FIG. 24, according to the engine cooling apparatus of the seventh embodiment, the fan efficiency ηf at the same operating point Po is approximately twice that of the engine cooling apparatus of the sixth embodiment. Accordingly, the electric power consumption (mechanical power consumption) of the engine cooling apparatus is reduced.

The operating point Po is the point of intersection between the total pressure ΔP and a curve R showing the ventilation resistance of the ducting system of the engine cooling apparatus. The terms total pressure ΔP and fan efficiency ηf are used here in accordance with JIS B 0132, and the experimental method used to obtain the graphs shown in FIGS. 24, 26 and 27 conforms to JIS B 8330.

(Eighth Embodiment)

Figure 25:
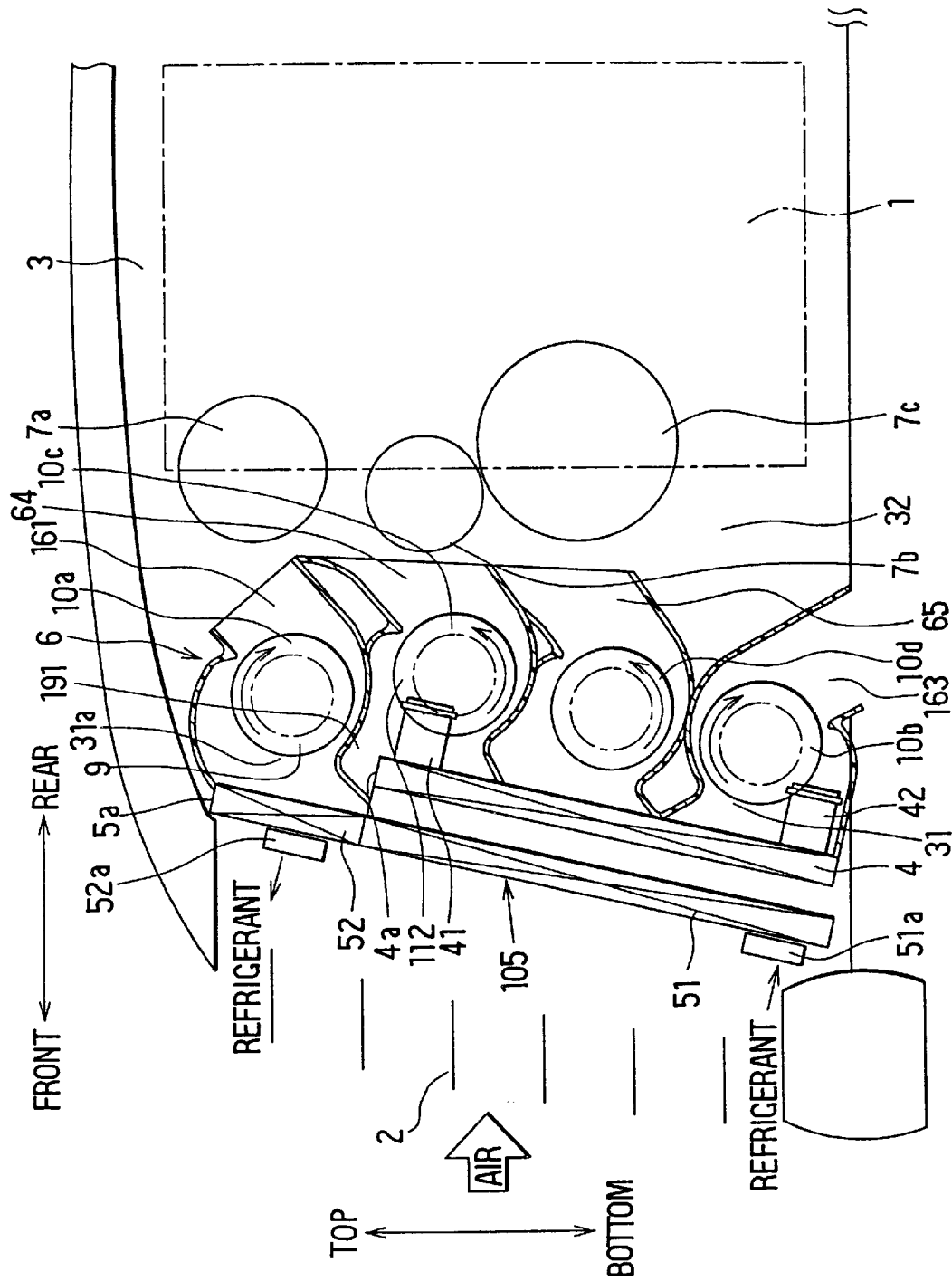
FIG. 25 is a schematic view showing an engine cooling apparatus according to an eighth embodiment of the present invention.
Figure 26:
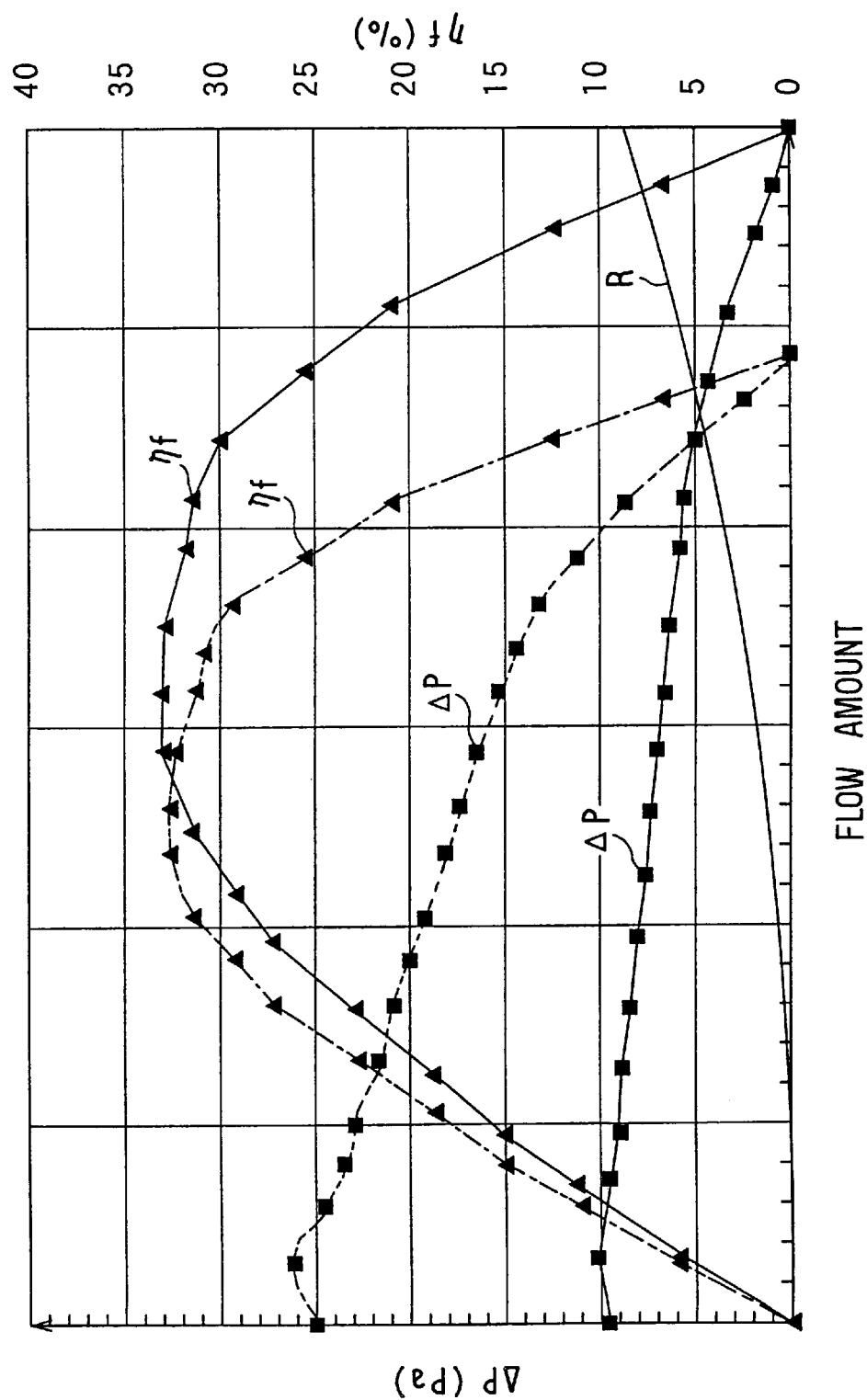
FIG. 26 is a graph showing characteristics of blowers in the sixth and eighth embodiments.
Figure 27:
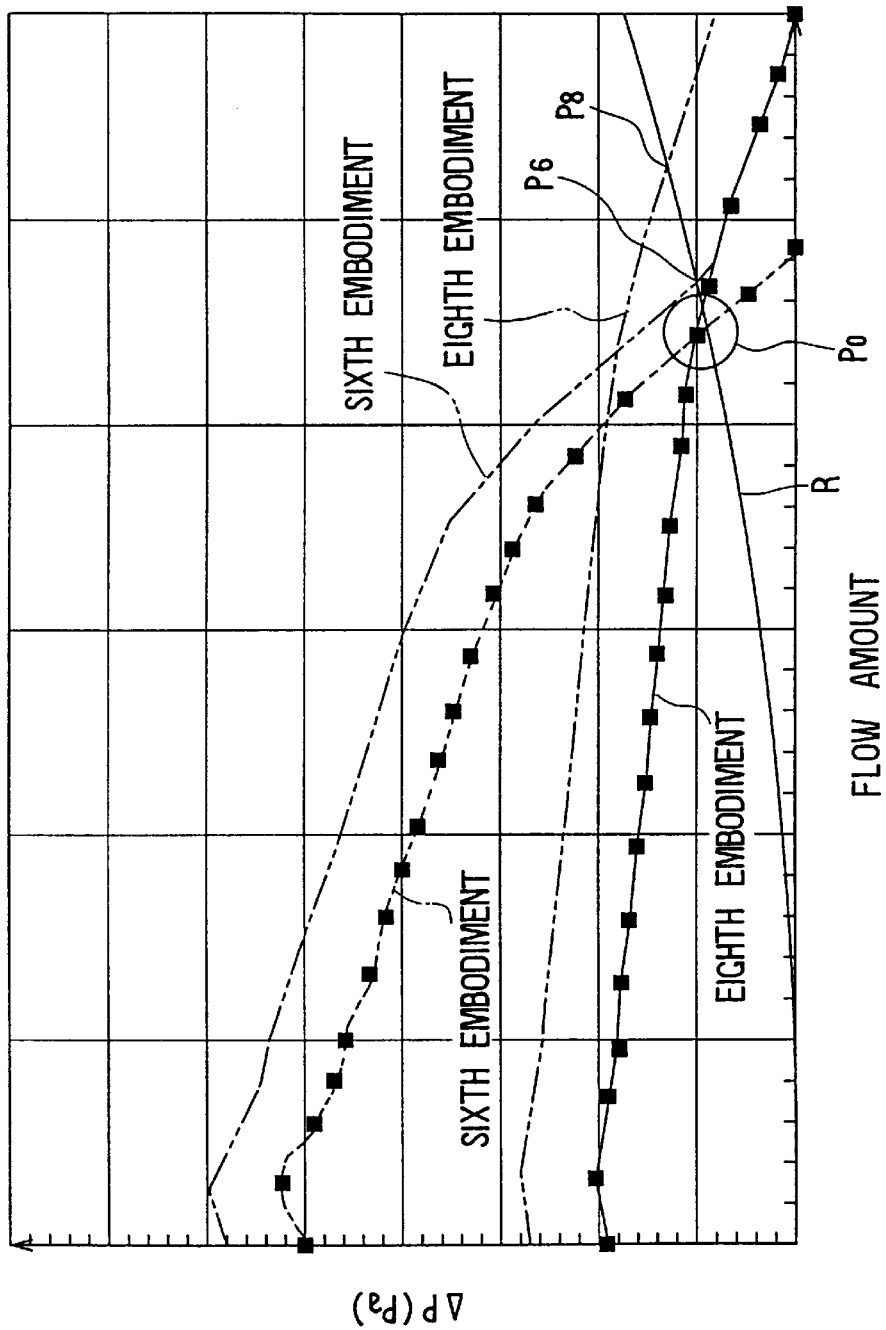
FIG. 27 is a graph showing characteristics of the blowers with/without the influence of a ram pressure according to the sixth and eighth embodiments.

An eighth embodiment is shown in FIGS. 25 to 27. As shown in FIG. 25, the eighth embodiment consists of the seventh embodiment with a fourth blower 10d added, bringing the number of blowers to four.

FIG. 26 shows characteristics of the blowers in the engine cooling apparatus of the sixth embodiment (dashed lines) and characteristics of the blowers in the engine cooling apparatus of the seventh embodiment (solid lines).

FIG. 27 shows the characteristics of the blowers when a ram pressure (wind pressure due to travel) is applied to the engine cooling apparatuses (dashed lines) of the sixth and eighth embodiment, and when the ram pressure is not applied (the vehicle is not running) to the engine cooling apparatuses (lines with black squares) of the sixth and eighth embodiment. The operating point P6 is the operating point of the engine cooling apparatus of the sixth embodiment, and the operating point P8 is the operating point of the engine cooling apparatus of the eighth embodiment.

As is clear from FIGS. 26 and 27, according to the engine cooling apparatus of the eighth embodiment, because the fan efficiency ηf is higher than the sixth embodiment, the electric power consumption (mechanical power consumption) of the engine cooling apparatus is reduced.

(Ninth Embodiment)

A ninth embodiment of the present invention will now be described with reference to FIGS. 28 to 31.

Figure 28:
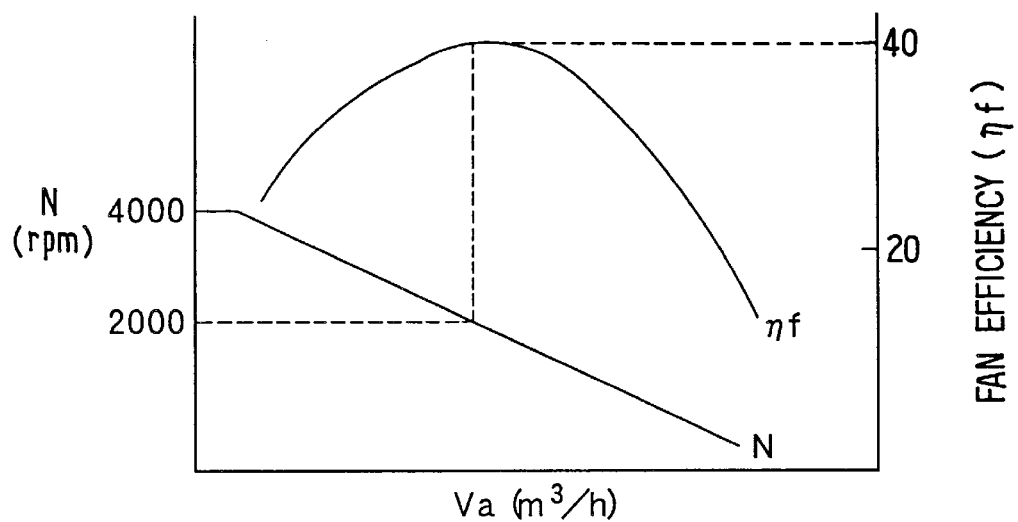
FIG. 28 is a graph showing characteristics of the blower according to a ninth embodiment of the present invention.
Figure 29:
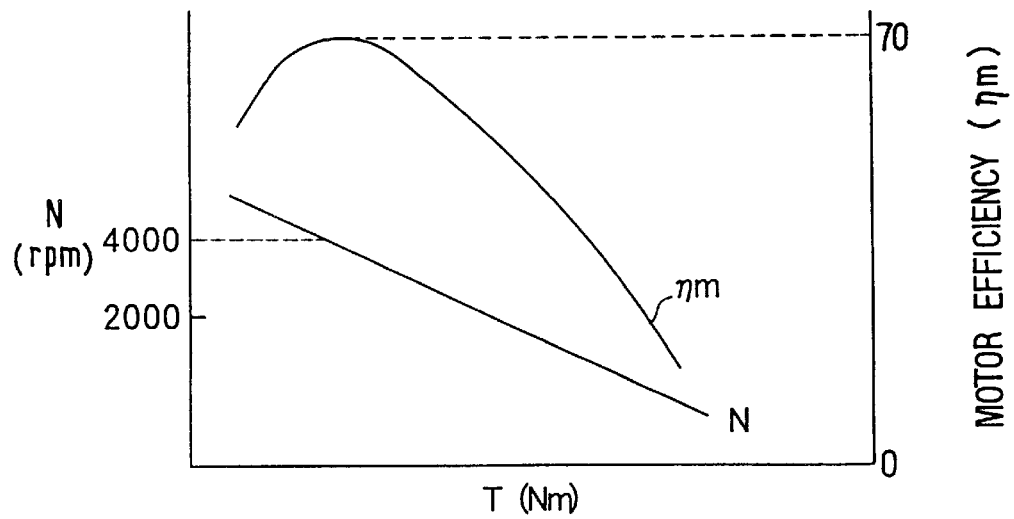
FIG. 29 is a graph showing characteristics of the motor according of the ninth embodiment.

In the ninth embodiment, attention is paid to the fact that the motor speed at which the motor efficiency ηm of an electric motor 10m is a maximum and the fan speed at which the fan efficiency ηf is a maximum do not necessarily coincide, as shown in FIGS. 28 and 29.

Figure 30:
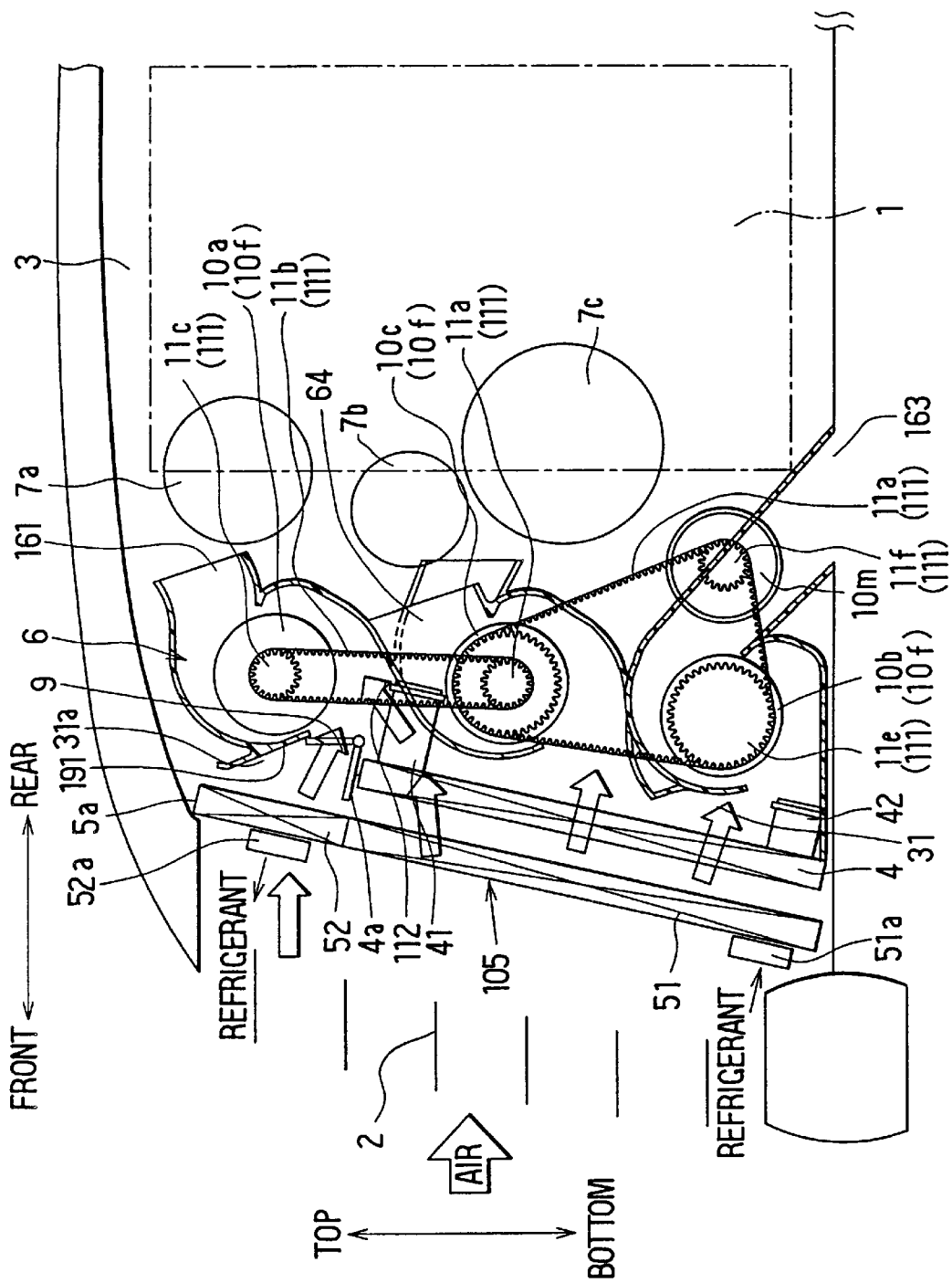
FIG. 30 is a schematic view showing an engine cooling apparatus of the ninth embodiment.
Figure 31:
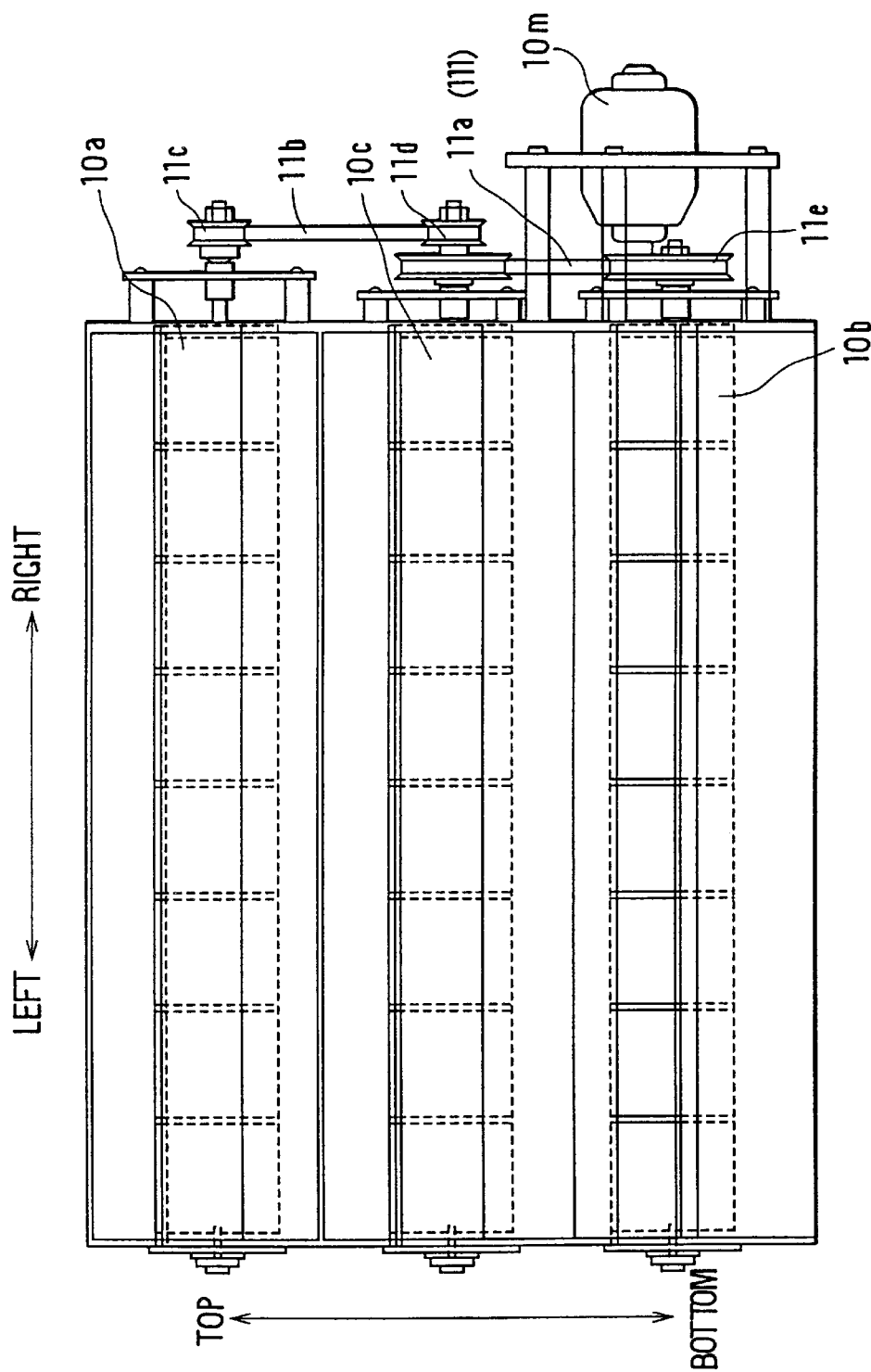
FIG. 31 is a front view of the same engine cooling apparatus viewed from an upstream side of the incoming air flow.

In the ninth embodiment, as shown in FIGS. 30 and 31, the driving force of the motor 10m is transmitted to the fans 10f by a transmission mechanism 111 made up of toothed belts (cog belts) 11a and 11b and toothed pulleys 11c through 11f meshing with the toothed belts 11a, 11b.

With this construction, even if the speed at which the motor efficiency ηm of the electric motor 10m is a maximum and the fan speed at which the fan efficiency ηf is a maximum are different, by suitably setting the speed ratio of the transmission mechanism 111 it is possible for the driving force of the motor 10m to be changed to the speed at which the fan efficiency ηf is a maximum as it is transmitted to the fans, and thus both the motor 10m and the fan 10f can be run efficiently.

Although in the ninth embodiment the toothed pulleys 11c through 11f and the fans 10f are directly connected, electromagnetic clutches for transmitting driving force intermittently may alternatively be provided between the toothed pulleys 11c through 11f and the fans 10f so that it is possible to operate only those of the first through third blowers 10a through 10c which are needed at the time.

Furthermore, whereas in the ninth embodiment the driving force of the motor 10m is transmitted to the blowers 10a through 10c (the fans 10f) by the transmission mechanism 111, instead of the motor 10m being used the driving force of the engine 1 may be transmitted to the blowers 10a through 10c (the fans 10f) by the transmission mechanism 111.

Further, a hydraulic motor for generating a rotary force (driving force) by means of hydraulic pressure may be used instead of the motor 10m.

(Other Modifications)

Figure 32:
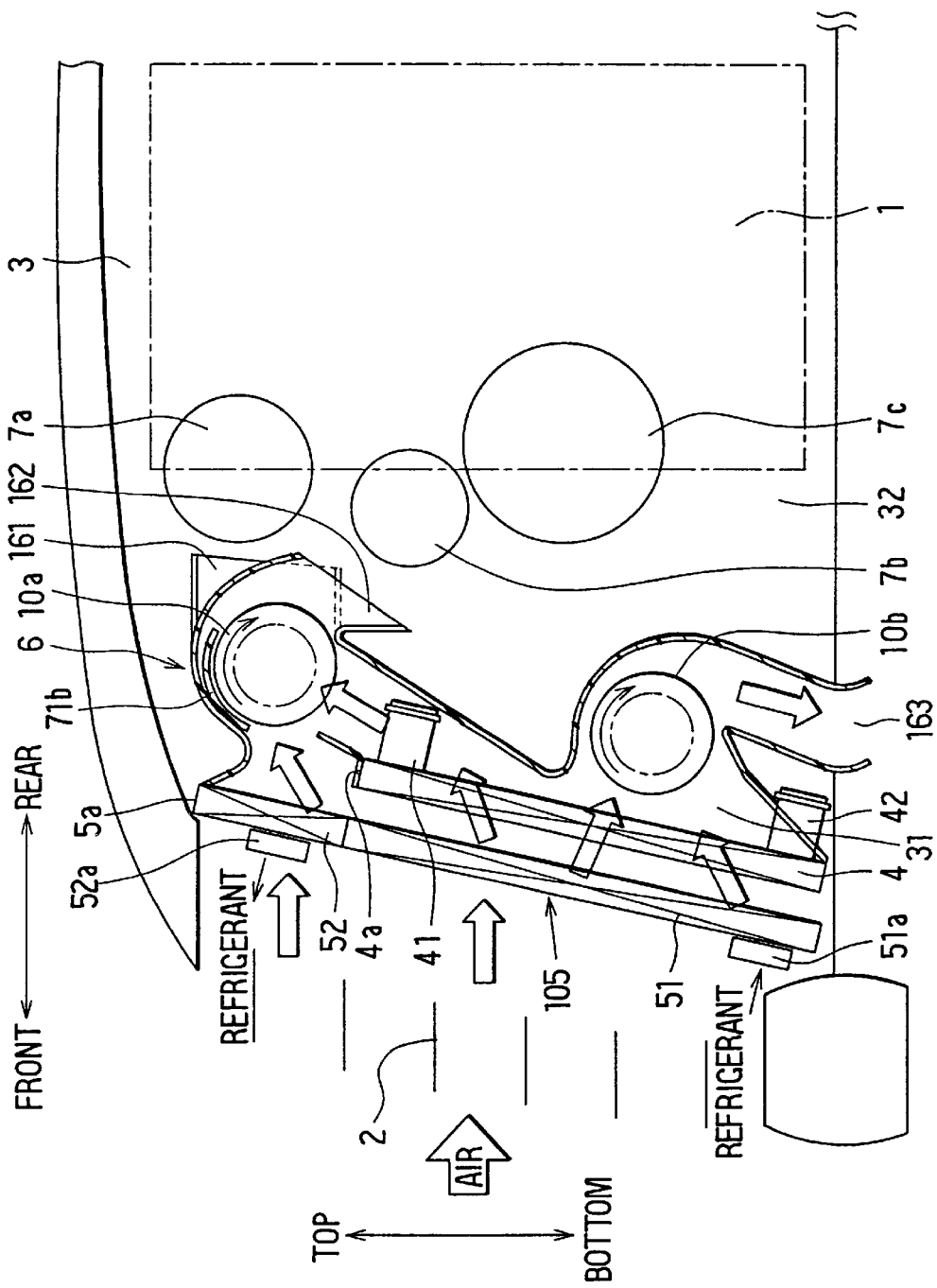
FIG. 32 is a schematic view showing a first mode of a modification example of the present invention.
Figure 33:
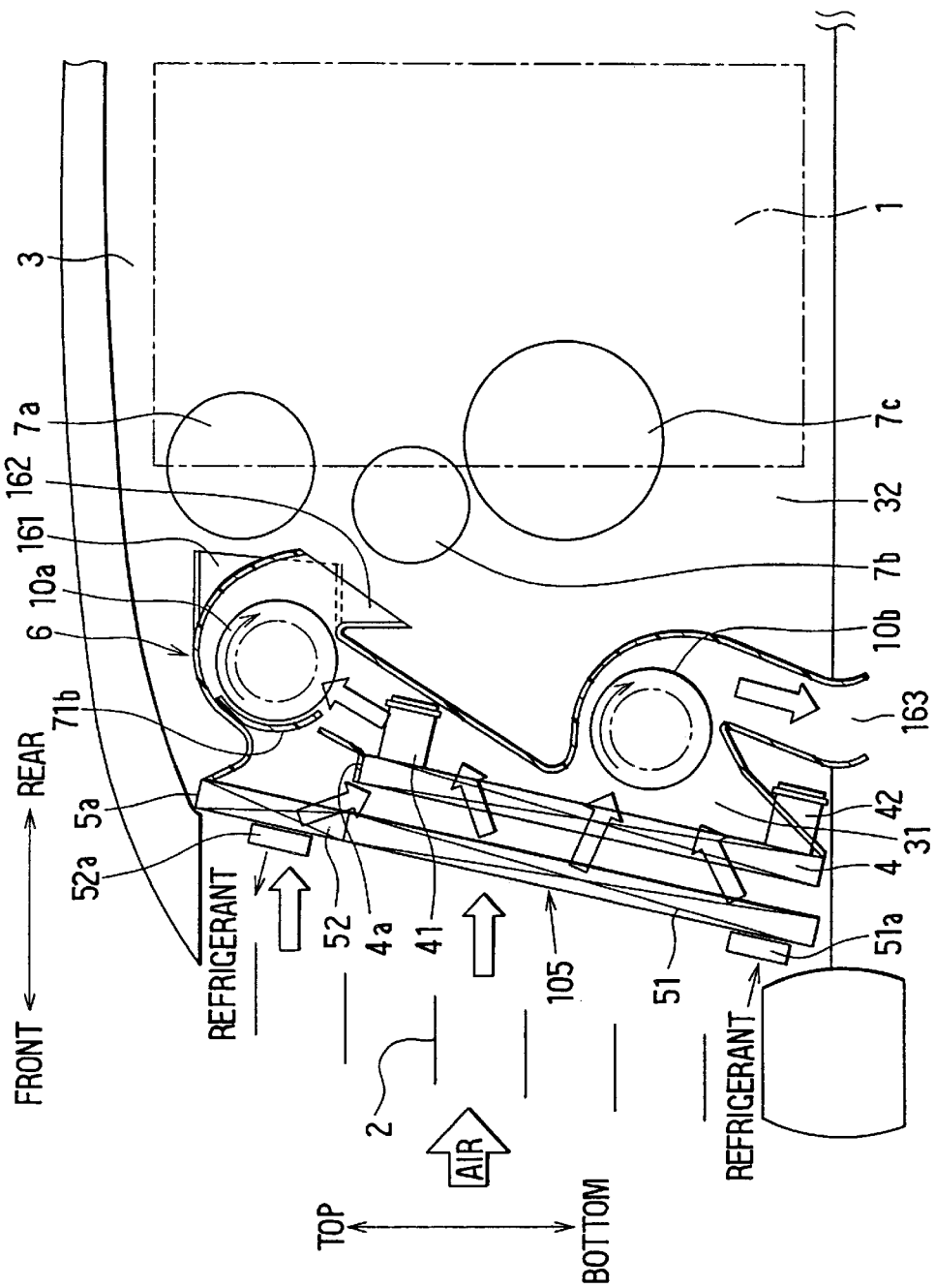
FIG. 33 is a schematic view showing a second mode of the modification example.

Whereas in the sixth through ninth embodiments the opening and closing of passages such as the bypass passage 31a is carried out using flat-plate doors, such as the doors 9 and 112, alternatively a rotary door 71b having an arcuate cross section may be used, as shown in FIGS. 32 through 34. FIG. 32 shows the position of the rotary door 71b in the first mode of a modification of the present invention. FIG. 33 shows the position of the rotary door 71b in the second mode of the modification of the present invention. FIG. 34 shows the position of the rotary door 71b in the third mode of the modification of the present invention.

Although according to the previous embodiments the shroud 6 was used to accommodate the radiator 4 and the heat exchanger 105 and constitute the air passages for the incoming air, alternatively the shroud 6 may be dispensed with and the engine compartment 3 itself used as air passage means.

According to the sixth through ninth embodiments, however, a heat exchanger 105 consisting of a condenser 51 with a subcooler 52 integrally mounted on its upper side is used, alternatively the subcooler 52 may be made separate or dispensed with so that the whole heat exchanger 105 consists of the condenser 51.

Although in the sixth through ninth embodiments the refrigerant flows into the heat exchanger 105 though its lower side and flows out from its upper side, alternatively for example the refrigerant may flow in through the upper side of the heat exchanger 105 and flow out from the lower side.

Also, the refrigerating cycle does not have to be one having flon as its refrigerant and may alternatively be one having carbon dioxide or other substances as its refrigerant.

An engine cooling apparatus according to this invention is not limited to use in vehicles and can also be used in other applications.

Also, the engine 1 does not have to be a so-called port injection type engine wherein fuel is injected into intake ports, and may alternatively be a direct injection type gasoline engine or diesel engine wherein fuel is injected into the combustion chambers.

An engine cooling apparatus for a vehicle according to the invention is not limited to application to a vehicle driven by an internal combustion engine and may also be applied to an electric vehicle driven by an electric motor (including railcars). However, in this case, it is necessary for the electric motor to be of a water-cooled type. And in the case of an electric vehicle, auxiliary equipment may be not only of course an air-conditioning compressor 12 of a vehicle air-conditioning system of the kind mentioned above but also a semiconductor device such as an inverter for controlling an electric motor.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An engine cooling apparatus for a vehicle having a water-cooled engine mounted in an engine compartment provided with an air inlet through which air is taken in to the engine compartment, the engine cooling apparatus comprising:
   a radiator, mounted in the engine compartment, for exchanging heat between said air and cooling water circulating inside the water-cooled engine, said air inlet being located at a vehicle front side of said radiator;
   a dividing wall, disposed between said radiator and the water-cooled engine, for dividing the inside of the engine compartment into a first space on the radiator side and a second space on the water-cooled engine side; wherein
   said dividing wall includes a first air passage for guiding incoming air taken into said first space through the air inlet to said second space, and includes a second air passage for guiding incoming air taken into said first space through the air inlet to outside the engine compartment.

2. An engine cooling apparatus according to claim 1, further comprising air discharging means for discharging to outside said first space incoming air taken in to said first space through the air inlet.

3. An engine cooling apparatus according to claim 1, wherein;
   said second space includes a heat-producing device therein;
   said first air passage is formed in an upper side of the engine compartment; and
   said second air passage is formed in a lower side of the engine compartment.

4. An engine cooling apparatus according to claim 1, further comprising a blower for forcibly discharging said incoming air to outside said first space.

5. An engine cooling apparatus for a vehicle having a water-cooled engine mounted in an engine compartment provided with an air inlet through which air is taken in to the engine compartment, the engine cooling apparatus comprising:
   a radiator, mounted in the engine compartment, for exchanging heat between said air and cooling water circulating inside the water-cooled engine;
   a dividing wall, disposed between said radiator and the water-cooled engine, for dividing the inside of the engine compartment into a first space on the radiator side and a second space on the water-cooled engine side;
   a heat exchanger disposed on an upstream side of said radiator for cooling refrigerant for a refrigerating cycle;
   a bypass passage for guiding air around said radiator to the water-cooled engine side so that the air bypasses said radiator; and
   bypass passage opening and closing means for, when a load on the engine reaches a predetermined value, increasing a flow of air passing through said radiator by closing said bypass passage.

6. An engine cooling apparatus according to claim 5, wherein said bypass passage is formed on an upper side of said radiator.

7. An engine cooling apparatus for a vehicle having a water-cooled engine mounted in an engine compartment provided with an air inlet through which air is taken in to the engine compartment, the engine cooling apparatus comprising:
   a radiator, mounted in the engine compartment, for exchanging heat between said air and cooling water circulating inside the water-cooled engine;
   a dividing wall, disposed between said radiator and the water-cooled engine, for dividing the inside of the engine compartment into a first space on the radiator side and a second space on the water-cooled engine side;
   air flow amount detecting means for detecting an amount of air flows into said first space;
   a communication port provided on said dividing wall for communicating said first space and said second space; and
   communication port opening and closing means for opening and closing said communication port, wherein;
   said communication port opening and closing means closes said communication port when an air flow amount detected by said air flow amount detecting means is equal to or less than a predetermined value; and
   said communication port opening and closing means opens said communication port when said air flow amount detected by said air flow amount detecting means is greater than said predetermined value.

8. An engine cooling apparatus according to claim 1, further comprising:
   air temperature detecting means for detecting temperature of said incoming air taken into said first space, wherein;
   said incoming air is restricted to be guided to said second space and is discharged to outside the engine compartment when said temperature detected by said air temperature detecting means is less than a predetermined temperature.

9. An engine cooling apparatus for a vehicle having a water-cooled engine mounted in an engine compartment provided with an air inlet through which air is taken in to the engine compartment, the engine cooling apparatus comprising:
   a radiator, mounted in the engine compartment, for exchanging heat between said air and cooling water circulating inside the water-cooled engine;
   a dividing wall, disposed between said radiator and the water-cooled engine, for dividing the inside of the engine compartment into a first space on the radiator side and a second space on the water-cooled engine side; and
   a cross-flow fan, provided in said first space, wherein air passes through a cross-section perpendicular to an axis of a multivane impeller thereof.

10. An engine cooling apparatus for a vehicle having a water-cooled engine mounted in an engine compartment provided with an air inlet through which air is taken in to the engine compartment, the engine cooling apparatus comprising:
   a radiator, mounted in the engine compartment, for exchanging heat between said air and cooling water circulating inside the water-cooled engine;

a dividing wall, disposed between said radiator and the water-cooled engine, for dividing the inside of the engine compartment into a first space on the radiator side and a second space on the water-cooled engine side;

a heat exchanger disposed on an upstream side of said radiator for cooling refrigerant for a refrigerating cycle;

a bypass passage, formed on an upper side of said radiator, for guiding air around said radiator to the water-cooled engine side so that the air bypasses said radiator; and bypass passage opening and closing means for, when a load on the engine reaches a predetermined value, increasing a flow of air passing through said radiator by closing said bypass passage, wherein:

an upper end of said heat exchanger is positioned above an upper end of said radiator; and said refrigerant flows in through a lower side of said heat exchanger and flows out through an upper side of said heat exchanger.

11. An engine cooling apparatus for a vehicle having a water-cooled engine mounted in an engine compartment provided with an air inlet through which air is taken in to the engine compartment, the engine cooling apparatus comprising:

a radiator, mounted in the engine compartment, for exchanging heat between said air and cooling water circulating inside the water-cooled engine;

a dividing wall, disposed between said radiator and the water-cooled engine, for dividing the inside of the engine compartment into a first space on the radiator side and a second space on the water-cooled engine side;

a condensor disposed on an upstream side of said radiator for condensing refrigerant for a refrigerating cycle;

a subcooler disposed on an upper side of said heat exchanger for increasing a degree of supercooling of refrigerant flowing out of said heat exchanger;

a bypass passage, formed on an upper side of said radiator, for guiding air around said radiator to the water-cooled engine side so that the air bypasses said radiator; and bypass passage opening and closing means for, when a load on the engine reaches a predetermined value, increasing a flow of air passing through said radiator by closing said bypass passage, wherein:

an upper end of said subcooler is positioned above an upper end of said radiator.

12. An engine cooling apparatus for a vehicle having a water-cooled engine mounted in an engine compartment provided with an air inlet through which air is taken in to the engine compartment, the engine cooling apparatus comprising:

a radiator, mounted in the engine compartment, for exchanging heat between said air and cooling water circulating inside the water-cooled engine;

a dividing wall, disposed between said radiator and the water-cooled engine, for dividing the inside of the engine compartment into a first space on the radiator side and a second space on the water-cooled engine side;

a heat exchanger disposed on an upstream side of said radiator for cooling refrigerant for a refrigerating cycle;

an air passage for housing said radiator and said heat exchanger;

a bypass passage, formed in said air passage, for guiding air around said radiator to the water-cooled engine side so that it bypasses said radiator; and bypass passage opening and closing means for, when a load on the engine reaches a predetermined value, increasing a flow of air passing through said radiator by closing said bypass passage.

13. An engine cooling apparatus according to claim 5, wherein said load on the water-cooled engine is detected on the basis of cooling water temperature of the water-cooled engine.

14. An engine cooling apparatus according to claim 10, wherein said load on the water-cooled engine is detected on the basis of cooling water temperature of the water-cooled engine.

15. An engine cooling apparatus according to claim 11, wherein said load on the water-cooled engine is detected on the basis of cooling water temperature of the water-cooled engine.

16. An engine cooling apparatus according to claim 12, wherein said load on the water-cooled engine is detected on the basis of cooling water temperature of the water-cooled engine.

17. An engine cooling apparatus for a vehicle having a water-cooled engine mounted in an engine compartment provided with an air inlet through which air is taken in to the engine compartment, the engine cooling apparatus comprising:

a radiator, mounted in the engine compartment, for exchanging heat between said air and cooling water circulating inside the water-cooled engine;

a dividing wall, disposed between said radiator and the water-cooled engine, for dividing the inside of the engine compartment into a first space on the radiator side and a second space on the water-cooled engine side;

a bypass passage, formed on an upper side of said radiator, for guiding air around said radiator to the water-cooled engine side so that it bypasses said radiator.

18. An engine cooling apparatus according to claim 5, further comprising at least three blowers each having a cross-flow fan wherein air passes through a cross-section perpendicular to an axis of a multivane impeller thereof and driving means for driving said cross-flow fan.

19. An engine cooling apparatus according to claim 10, further comprising at least three blowers each having a cross-flow fan wherein air passes through a cross-section perpendicular to an axis of a multivane impeller thereof and driving means for driving said cross-flow fan.

20. An engine cooling apparatus according to claim 11, further comprising at least three blowers each having a cross-flow fan wherein air passes through a cross-section perpendicular to an axis of a multivane impeller thereof and driving means for driving said cross-flow fan.

21. An engine cooling apparatus according to claim 12, further comprising at least three blowers each having a cross-flow fan wherein air passes through a cross-section perpendicular to an axis of a multivane impeller thereof and driving means for driving said cross-flow fan.

22. An engine cooling apparatus according to claim 14, further comprising at least three blowers each having a cross-flow fan wherein air passes through a cross-section perpendicular to an axis of a multivane impeller thereof and driving means for driving said cross-flow fan.

23. An engine cooling apparatus according to claim 18, wherein a driving force of said driving means is transmitted to said cross-flow fan by a speed-changing transmission mechanism.

* * * * *